(12) United States Patent
Chen et al.

(10) Patent No.: US 9,363,016 B2
(45) Date of Patent: Jun. 7, 2016

(54) APPARATUS AND METHOD FOR REDUCING TRAFFIC ON A UNIFIED OPTICAL AND COAXIAL NETWORK

(71) Applicant: Futurewei Technologies, Inc., Plano, TX (US)

(72) Inventors: Jim Chen, Corona, CA (US); Fanglin Sun, Shenzhen (CN); Li Zhang, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 415 days.

(21) Appl. No.: 13/691,761

(22) Filed: Dec. 1, 2012

(65) Prior Publication Data

US 2013/0142513 A1 Jun. 6, 2013

Related U.S. Application Data

(60) Provisional application No. 61/566,101, filed on Dec. 2, 2011.

(51) Int. Cl.
*H04J 14/00* (2006.01)
*H04B 10/27* (2013.01)
*H04Q 11/00* (2006.01)
*H04B 10/2575* (2013.01)

(52) U.S. Cl.
CPC ............ *H04B 10/27* (2013.01); *H04Q 11/0067* (2013.01); *H04B 10/2575* (2013.01); *H04Q 11/0071* (2013.01); *H04Q 2011/0088* (2013.01)

(58) Field of Classification Search
CPC ............... H04B 10/27; H04B 10/2575; H04Q 11/0067; H04Q 2011/0088; H04Q 11/0071

USPC .......................................... 398/58–64, 66–73
See application file for complete search history.

(56) References Cited

U.S. PATENT DOCUMENTS 6,967,949 B2 * 11/2005 Davis et al. .................... 370/390
7,286,538 B2 * 10/2007 Song et al. .................... 370/392
(Continued)

FOREIGN PATENT DOCUMENTS

EP          2117167 A1    11/2009
WO    2010115824 A2    10/2010
(Continued)

OTHER PUBLICATIONS

Chen, J., "An Example of Designing a Coax Convergence Layer in EPoC," Huawei, XP002713588, Jun. 22, 2012, 9 pages.
(Continued)

*Primary Examiner* — Ken N Vanderpuye
*Assistant Examiner* — Dibson Sanchez
(74) *Attorney, Agent, or Firm* — Conley Rose, P.C.; Grant Rodolph; Jonathan K. Polk

(57) ABSTRACT

A coaxial line terminal (CLT) comprising an optical port configured to couple to an optical line terminal (OLT) via an optical distribution network (ODN), an electrical port configured to couple to a coaxial network unit (CNU) via an electrical distribution network, and a processor coupled to the optical port and the electrical port, wherein the processor is configured to receive from the OLT a plurality of first frames addressed to the CNU, receive from the OLT a plurality of second frames not addressed to the CNU, forward the first frames to the CNU, and prohibit the second frames from being forwarded to the CNU.

15 Claims, 14 Drawing Sheets

(56) References Cited

U.S. PATENT DOCUMENTS

| | | | |
|---|---|---|---|
| 7,289,501 B2* | 10/2007 | Davis | 370/390 |
| 7,301,907 B2* | 11/2007 | Anbarani | 370/235 |
| 7,330,655 B2* | 2/2008 | Kim et al. | 398/72 |
| 7,372,854 B2* | 5/2008 | Kang et al. | 370/390 |
| 7,428,586 B2* | 9/2008 | Sutherland | H04L 12/413 709/224 |
| 7,450,719 B2* | 11/2008 | Lee et al. | 380/256 |
| 7,492,768 B2* | 2/2009 | Yoon et al. | 370/392 |
| 7,558,482 B2* | 7/2009 | Tanaka et al. | 398/100 |
| 7,684,403 B2* | 3/2010 | Kim et al. | 370/392 |
| 7,697,547 B2* | 4/2010 | Diouf | H04L 12/5601 370/236.2 |
| 7,756,111 B2* | 7/2010 | Minami | 370/352 |
| 7,792,107 B2* | 9/2010 | Kusano et al. | 370/390 |
| 8,036,530 B2 | 10/2011 | Arnold et al. | |
| 8,064,442 B2* | 11/2011 | Boyd et al. | 370/389 |
| 8,077,631 B2* | 12/2011 | Yu | H04B 3/52 370/252 |
| 8,165,173 B2* | 4/2012 | Yu | H04J 3/0658 370/503 |
| 8,305,920 B2* | 11/2012 | Yu | H04L 12/413 370/252 |
| 8,311,217 B2* | 11/2012 | Yu | H04L 9/083 380/255 |
| 8,442,398 B2* | 5/2013 | Li et al. | 398/16 |
| 2002/0067802 A1 | 6/2002 | Smith et al. | |
| 2003/0014762 A1 | 1/2003 | Conover et al. | |
| 2003/0070063 A1 | 4/2003 | Boyle et al. | |
| 2004/0028409 A1* | 2/2004 | Kim et al. | 398/71 |
| 2004/0052274 A1 | 3/2004 | Wang et al. | |
| 2004/0057431 A1 | 3/2004 | Song et al. | |
| 2004/0114592 A1* | 6/2004 | Kang et al. | 370/389 |
| 2004/0120315 A1* | 6/2004 | Han et al. | 370/389 |
| 2004/0136712 A1* | 7/2004 | Stiscia et al. | 398/60 |
| 2004/0264964 A1* | 12/2004 | BuAbbud | H04N 7/17309 398/72 |
| 2005/0047782 A1* | 3/2005 | Davis et al. | 398/58 |
| 2005/0047783 A1 | 3/2005 | Sisto et al. | |
| 2005/0071492 A1 | 3/2005 | Li et al. | |
| 2005/0083950 A1 | 4/2005 | Choi et al. | |
| 2005/0089009 A1 | 4/2005 | Raleigh et al. | |
| 2005/0100036 A1 | 5/2005 | Davis | |
| 2005/0129030 A1* | 6/2005 | Choi et al. | 370/395.53 |
| 2005/0135609 A1* | 6/2005 | Lee et al. | 380/30 |
| 2005/0158048 A1* | 7/2005 | Sung | H04J 3/1694 398/66 |
| 2005/0249498 A1* | 11/2005 | Haran | H04L 47/13 398/58 |
| 2006/0039390 A1 | 2/2006 | Boyd et al. | |
| 2006/0067691 A1* | 3/2006 | Hirano | H04J 3/1694 398/71 |
| 2007/0019957 A1* | 1/2007 | Kim et al. | 398/72 |
| 2007/0022469 A1 | 1/2007 | Cooper et al. | |
| 2007/0127487 A1* | 6/2007 | Kim et al. | 370/392 |
| 2007/0180142 A1 | 8/2007 | Small et al. | |
| 2007/0180483 A1 | 8/2007 | Popoviciu et al. | |
| 2007/0189771 A1 | 8/2007 | Kim | |
| 2007/0248120 A1 | 10/2007 | Ali et al. | |
| 2008/0101793 A1 | 5/2008 | Koch et al. | |
| 2008/0130657 A1* | 6/2008 | Kim et al. | 370/395.41 |
| 2008/0232801 A1 | 9/2008 | Arnold et al. | |
| 2008/0260378 A1* | 10/2008 | Khermosh | 398/17 |
| 2009/0060531 A1* | 3/2009 | Biegert et al. | 398/214 |
| 2009/0067835 A1* | 3/2009 | Chen | H04J 3/14 398/45 |
| 2009/0097861 A1* | 4/2009 | Ikeda | H04J 3/1694 398/167.5 |
| 2009/0103918 A1 | 4/2009 | Tsuge et al. | |
| 2009/0175622 A1* | 7/2009 | Lee | H04J 14/0227 398/79 |
| 2009/0232498 A1 | 9/2009 | Tsuge et al. | |
| 2009/0290504 A1* | 11/2009 | Yu | H04L 12/2801 370/252 |
| 2009/0290505 A1* | 11/2009 | Yu | 370/252 |
| 2009/0296733 A1 | 12/2009 | Yu | |
| 2010/0074167 A1 | 3/2010 | Dale et al. | |
| 2010/0080558 A1* | 4/2010 | Kazawa | H04L 3/0682 398/66 |
| 2010/0083330 A1 | 4/2010 | Bernstein et al. | |
| 2010/0111524 A1* | 5/2010 | Yu | H04J 3/1694 398/41 |
| 2010/0150556 A1* | 6/2010 | Soto | H04M 19/08 398/66 |
| 2010/0158520 A1* | 6/2010 | Han et al. | 398/58 |
| 2010/0177645 A1 | 7/2010 | Kang et al. | |
| 2010/0238950 A1 | 9/2010 | Beser | |
| 2010/0260259 A1 | 10/2010 | Kimmich et al. | |
| 2011/0013540 A1 | 1/2011 | O'Mahony | |
| 2011/0026930 A1 | 2/2011 | Cui et al. | |
| 2011/0058813 A1 | 3/2011 | Boyd et al. | |
| 2011/0202956 A1 | 8/2011 | Connelly et al. | |
| 2011/0271313 A1 | 11/2011 | Urban et al. | |
| 2012/0023522 A1 | 1/2012 | Anderson et al. | |
| 2012/0257891 A1* | 10/2012 | Boyd et al. | 398/45 |
| 2012/0257892 A1 | 10/2012 | Boyd et al. | |
| 2012/0257893 A1 | 10/2012 | Boyd et al. | |
| 2013/0004155 A1* | 1/2013 | Liang et al. | 398/9 |
| 2013/0117425 A1 | 5/2013 | Jarl | |
| 2013/0236177 A1 | 9/2013 | Fang et al. | |
| 2013/0236185 A1 | 9/2013 | Fang et al. | |

FOREIGN PATENT DOCUMENTS

| | | |
|---|---|---|
| WO | 2011031831 A1 | 3/2011 |
| WO | 2012007039 A1 | 1/2012 |

OTHER PUBLICATIONS

Chunhua, W., et al., "A Novel Ethernet Over Coax Solution Employing Multi-Point Control Protocol," Nov. 14-16, 2011, 5 pages.

Sivalingam, K., et al., "Emerging Optical Network Technologies: Architectures, Protocols and Performance," Springer, 2005, 5 pages.

Held, G., "Carrier Ethernet: Providing the Need for Speed," CRC Press, Taylor & Francis Group, 2008, pp. 94-98.

Choi, S., "IPTV Delivery Architecture in 10G EPONs using ONU-Based Multicast Emulation," Journal of the Optical Society of Korea, vol. 12, No. 2, Jun. 2008, pp. 69-78.

Office Action dated Aug. 12, 2014, 32 pages, U.S. Appl. No. 13/691,762, filed Dec. 1, 2012.

Office Action dated Aug. 25, 2014, 37 pages, U.S. Appl. No. 13/691,764, filed Dec. 1, 2012.

Foreign Communication From a Counterpart Application, PCT Application PCT/US2012/067496, International Search Report dated Feb. 6, 2013, 4 pages.

Foreign Communication From a Counterpart Application, PCT Application PCT/US2012/067496, Written Opinion dated Feb. 6, 2013, 5 pages.

Foreign Communication From a Related Counterpart Application, PCT Application PCT/US2012/67495, International Search Report dated Feb. 6, 2013, 4 pages.

Foreign Communication from a Related Counterpart Application, PCT Application PCT/US2012/67495; Written Opinion dated Feb. 6, 2013, 5 pages.

Foreign Communication From a Related Counterpart Application, PCT Application PCT/US2012/67497, International Search Report dated Feb. 6, 2013, 4 pages.

Foreign Communication from a Related Counterpart Application, PCT Application PCT/US2012/67497; Written Opinion dated Feb. 6, 2013, 5 pages.

"Broadcom Introduces DOCSIS—Based EoC for EPON Product Portfolio in Support of China's Network Convergence," Press Release; http://www.broadcom.com/press/release.php?id-s523445, Oct. 27, 2010, 2 pages.

"Operating the EPON Protocol Over Coaxial Distribution Networks Call for Interest," IEEE 802.3 Ethernet Working Group, Nov. 8, 2011, Atlanta, Georgia, 38 pages.

IEEE Std 802.3,"Part 3: Carrier Sense Multiple Access with Collision Detection (CSMA/CD) Access Method and Physical Layer Specifications,"—Section 5, 2008, pp. 1-615.

(56) References Cited

OTHER PUBLICATIONS

Foreign Communication from a Related Counterpart Application, PCT Application PCT/US2013/029677, International Search Report dated May 17, 2013, 4 pages.

Foreign Communication from a Related Counterpart Application, PCT Application PCT/US2013/029677, Written Opinion dated May 17, 2013, 4 pages.

Office Action dated Jul. 15, 2014, 28 pages, U.S. Appl. No. 13/789,318, filed Mar. 7, 2013.

Mukherjee, B., et al., "Optical WDM Networks," Springer, Optical Networks Series, 2006, pp. 234-236.

Choi, S., et al., "Multicasting for EPON," IEEE 802.3ah EFM, Mar. 2004, 7 pages.

Office Action dated Feb. 23, 2015, 37 pages, U.S. Appl. No. 13/691,762, filed Dec. 1, 2012.

Office Action dated Mar. 10, 2015, 44 pages, U.S. Appl. No. 13/691,764, filed Dec. 1, 2012.

Notice of Allowance dated Jan. 13, 2016, 11 pages, U.S. Appl. No. 13/691,762, filed Dec. 1, 2012.

\* cited by examiner

APPARATUS AND METHOD FOR REDUCING TRAFFIC ON A UNIFIED OPTICAL AND COAXIAL NETWORK

CROSS-REFERENCE TO RELATED APPLICATIONS

The present application claims the benefit of U.S. Provisional Patent Application No. 61/566,101 filed Dec. 2, 2011 by Jim Chen, et al. and entitled "Method of Identifying a Transit Node in an Ethernet Passive Optical Network over Coax Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at the central office, an optical distribution network (ODN), and a plurality of optical network units (ONUs) at the customer premises. Ethernet passive optical network (EPON) is a PON standard developed by the Institute of Electrical and Electronics Engineers (IEEE) and specified in IEEE 802.3ah, which is incorporated herein by reference as if reproduced in its entirety. In EPON, a single fiber can be used for both the upstream and the downstream transmission with different wavelengths. The OLT implements an EPON Media Access Control (MAC) layer for transmission of Ethernet Frames. The Multi-Point Control Protocol (MPCP) performs the bandwidth assignment, bandwidth polling, auto-discovery, and ranging. Ethernet frames are broadcast downstream based on the Logical Link Identifier (LLID) embedded in the preamble frame. Upstream bandwidth is assigned based on the exchange of Gate and Report messages between an OLT and an ONU.

Ethernet over Coaxial (EoC) is a generic name used to describe all technologies which can be used for transmission of Ethernet frames over a unified optical-coaxial network. The name comes from the fact that, except for Data Over Cable Service Interface Specification (DOCSIS), all these technologies have in common that the Ethernet Frames are transmitted in the MAC layer. Different EoC technologies exist, including Multimedia over Coax Alliance (MoCA), G.hn (a common name for a home network technology family of standards developed under the International Telecommunication Union (ITU) and promoted by the HomeGrid Forum), HomePNA Alliance (HPNA), and Home Plug Audio/Visual (A/V), and they have been adapted to run the outdoor coaxial access from an ONU to an EoC Head End with connected Customer Premises Equipment (CPEs) located in the subscriber homes.

There is a rising demand which requires the use of EPON as an access system to interconnect with multiple coaxial cables to terminate the Coaxial Network Units (CNUs) located in the subscriber's home with an Ethernet PON over Coaxial (EPoC) architecture. However, none of the above-referenced EoC technologies provides a unique way to identify the EoC Head End that connects the EPON and Coaxial networks. Consequently, there is a need in the art for methods and systems to provide a unique identifier to an EoC Head End (which may also be referred to as a transit node (TN), a Coaxial Media Converter (CMC) or Coaxial Line Terminal (CLT), and those skilled in the art would recognize these as synonymous).

SUMMARY

In an embodiment, the disclosure includes a coaxial line terminal (CLT) comprising an optical port configured to couple to an OLT via an ODN, an electrical port configured to couple to a CNU via an electrical distribution network, and a processor coupled to the optical port and the electrical port, wherein the processor is configured to receive from the OLT a plurality of first frames addressed to the CNU, receive from the OLT a plurality of second frames not addressed to the CNU, forward the first frames to the CNU, and prohibit the second frames from being forwarded to the CNU.

In another embodiment, the disclosure includes a method comprising receiving a frame on an optical portion of a unified optical-coaxial network, and transmitting the frame to a CNU via a coaxial electrical portion of the unified optical-coaxial network if the frame comprises a logical node identifier (LNID) assigned to a CLT coupled to the optical network portion and the coaxial electrical network portion.

In yet another embodiment, the disclosure includes an apparatus comprising a processor, a memory comprising instructions that cause the processor to receive a frame on an optical network portion of a unified optical-coaxial network, determine if the frame comprises a LNID contained in a LLID filter table maintained in a CLT coupled to the optical network portion and the coaxial electrical network portion, and drop the frame if the frame does not comprise a LLID contained in the LLID filter table.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatus to support the unified optical-coaxial network architecture. In one embodiment, this disclosure provides a CLT identifier, referred to as Logical Node Identification (LNID), which may be placed in the preamble field of an EPON frame to uniquely identify a specific CLT between the optical and coaxial portions of the unified optical-coaxial network. The LNID may be placed in the reserved bits of an existing LLID, and can be used to identify a directly connected CLT. In an embodiment, the disclosure provides a mechanism for registering various CNUs with the OLT via the CLT. In yet another embodiment, the disclosure provides a mechanism by which the CLT may filter traffic that is not designated to its CNUs, thereby reducing the amount of unnecessary traffic on the coaxial portion of the unified optical-coaxial network.

Figure 1:
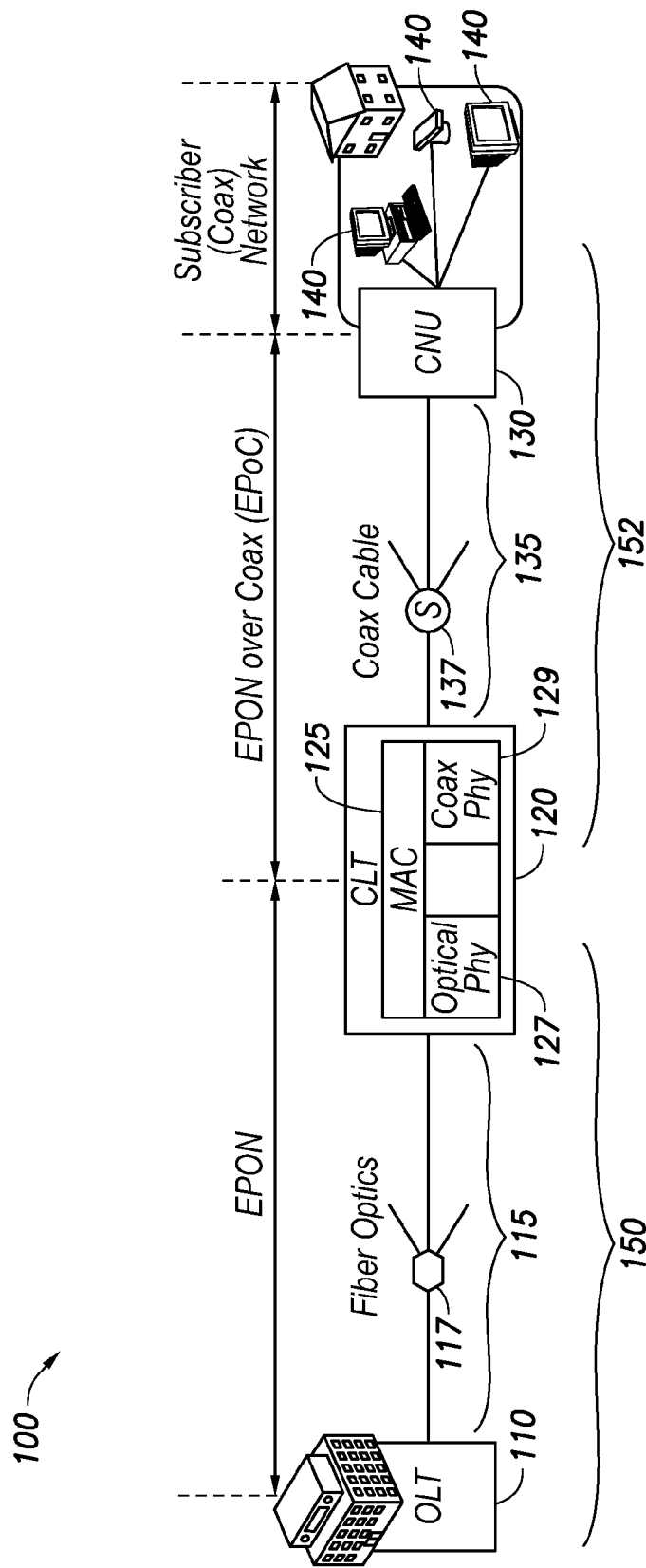
FIG. 1 is a schematic diagram of a unified optical-coaxial network according to an embodiment of the disclosure.

Refer now to FIG. 1 illustrating an embodiment of a unified optical-coaxial network 100 comprising an optical portion 150 and a coaxial (electrical) portion 152. The unified optical-coaxial network 100 may include an OLT 110, at least one CNU 130 coupled to a plurality of subscriber devices 140, and a CLT 120 positioned between the OLT 110 and the CNU 130, e.g., between the optical portion 150 and the coaxial portion 152. The OLT 110 may be coupled via an Optical Distribution Network (ODN) 115 to the CLTs 120, and optionally to one or more ONUs (not shown) in the optical portion 150. The ODN 115 may comprise fiber optics and an optical splitter 117 that couples OLT 110 to the CLT 120 and any ONUs. The CLT 120 may be coupled to the CNUs 130 via an electrical distribution network (EDN) 135, which may comprise a cable splitter 137. Although FIG. 1 shows one CLT 120 and one CNU 130, the unified optical-coaxial network 100 may comprise any number of CLTs 120 and corresponding CNUs 130. The components of unified optical-coaxial network 100 may be arranged as shown in FIG. 1 or any other suitable arrangement.

The optical portion 150 of the unified optical-coaxial network 100 may be similar to a PON in that it may be a communications network that does not require any active components to distribute data between the OLT 110 and the CLT 120. Instead, the optical portion 150 may use the passive optical components in the ODN 115 to distribute data between the OLT 110 and the CLT 120. Examples of suitable protocols that may be implemented in the optical portion 150 include the asynchronous transfer mode PON (APON) and the broadband PON (BPON) defined by the ITU Telecommunication Standardization Sector (ITU-T) G.983 standard, Gigabit PON (GPON) defined by the ITU-T G.984 standard, the EPON defined by the IEEE 802.3ah standard, and the wavelength division multiplexing (WDM) PON (WDM-PON), all of which are incorporated by reference as if reproduced in their entirety.

The OLT 110 may be any device configured to communicate with the CNUs 130 via the CLT 120. The OLT 110 may act as an intermediary between the CLTs 120 or CNUs 130 and another network (not shown). The OLT 110 may forward data received from the other network to the CLTs 120 or CNUs 130 and forward data received from the CLTs 120 or CNUs 130 onto the other network. Although the specific configuration of the OLT 110 may vary depending on the type of optical protocol implemented in the optical portion 150, in an embodiment, OLT 110 may comprise an optical transmitter and an optical receiver. When the other network is using a network protocol that is different from the protocol used in the optical portion 150, OLT 110 may comprise a converter that converts the other network protocol into the optical portion 150 protocol. The OLT converter may also convert the optical portion 150 protocol into the other network protocol.

The ODN 115 may be a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the CLT 120. It should be noted that the optical fiber cables may be replaced by any optical transmission media in some embodiments. In some embodiments, the ODN 115 may comprise one or more optical amplifiers. The ODN 115 typically extends from the OLT 110 to the CLT 120 and any optional ONUs (not shown) in a branching configuration as shown in FIG. 1, but may be alternatively configured as determined by a person of ordinary skill in the art.

The CLT 120 may be any device or component configured to forward downstream data from the OLT 110 to the corresponding CNUs 130 and forward upstream data from the CNUs 130 to the OLT 110. The CLT 120 may convert the downstream and upstream data appropriately to transfer the data between the optical portion 150 and the coaxial portion 152. The data transferred over the ODN 115 may be transmitted or received in the form of optical signals, and the data transferred over the EDN 135 may be transmitted or received in the form of electrical signals that may have the same or different logical structure as compared with the optical signals. As such, the CLT 120 may encapsulate or frame the data in the optical portion 150 and the coaxial portion 152 differently. In an embodiment, the CLT 120 includes a media access control (MAC) layer 125 and physical (PHY) layers, corresponding to the type of signals carried over the respective media. The MAC layer 125 may provide addressing and channel access control services to the PHY layers. As such, the PHY may comprise an optical PHY 127 and a coaxial PHY 129. In many embodiments, the CLT 120 is transparent to the CNU 130 and OLT 110 in that the frames sent from the OLT 110 to the CNU 130 may be directly addressed to the CNU 130 (e.g. in the destination address), and vice-versa. As such, the CLT 120 intermediates between network portions, namely an optical portion 150 and a coaxial portion 152 in the example of FIG. 1. As discussed further below, an identifier may be associated with each CLT 120, and the identifier may uniquely identify the each CLT 120.

The electrical portion 152 of the unified electrical and coaxial network 100 may be similar to any known electrical communication system. The electrical portion 152 may not require any active components to distribute data between the CLT 120 and the CNU 130. Instead, the electrical portion 152 may use the passive electrical components in the electrical portion 152 to distribute data between the CLT 120 and the CNUs 130. Alternatively, the electrical portion 152 could use some active components, such as amplifiers. Examples of suitable protocols that may be implemented in the electrical portion 152 include MoCA, G.hn, HPNA, and Home Plug A/V, all of which are incorporated by reference as if reproduced in their entirety.

The EDN 135 may be a data distribution system that may comprise electrical cables (e.g. coaxial cable, twisted wires, etc.), couplers, splitters, distributors, and/or other equipment. In an embodiment, the electrical cables, couplers, splitters, distributors, and/or other equipment are passive electrical components. Specifically, the electrical cables, couplers, splitters, distributors, and/or other equipment may be components that do not require any power to distribute data signals between the CLT 120 and the CNU 130. It should be noted that the electrical cables may be replaced by any electrical transmission media in some embodiments. In some embodiments, the EDN 135 may comprise one or more electrical amplifiers. The EDN 135 typically extends from the CLT 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, the CLT 120, and any subscriber devices 140. Specifically, the CNUs 130 may act as an intermediary between the CLT 120 and the subscriber devices 140. For instance, the CNUs 130 may forward data received from the CLT 120 to the subscriber devices 140, and forward data received from the subscriber devices 140 onto the OLT 110. Although the specific configuration of the CNUs 130 may vary depending on the type of unified optical-coaxial network 100, in an embodiment the CNUs 130 may comprise an electrical transmitter configured to send electrical signals to the CLT 120 and an electrical receiver configured to receive electrical signals from the CLT 120. Additionally, the CNUs 130 may comprise a converter that converts the electrical signal into electrical signals for the subscriber devices 140, such as signals in the asynchronous transfer mode (ATM) protocol, and a second transmitter and/or receiver that may send and/or receive the electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscribed devices 140 may include desktop computers, laptop computers, tablets, mobile telephones, residential gateways, televisions, set-top boxes, and similar devices.

Figure 2:
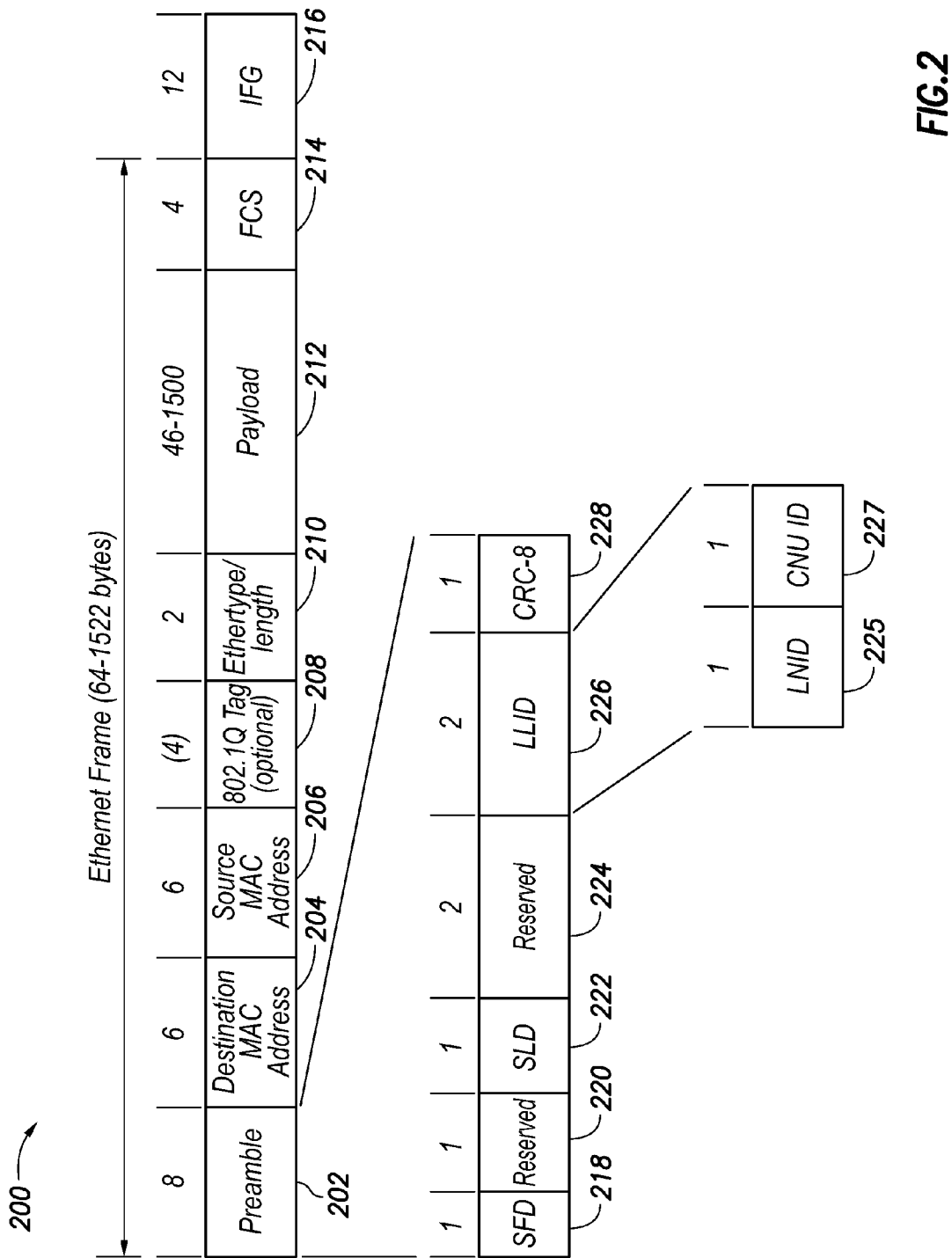
FIG. 2 is a schematic diagram of an Ethernet frame in accordance with an embodiment of the disclosure.

Refer now to FIG. 2 illustrating an Ethernet frame 200 in accordance with one embodiment of the disclosure. Frame 200 begins with an 8-byte Preamble 202. Following the Preamble 202 are a 6-byte destination MAC address 204, a 6-byte source MAC address 206, an optional 4-byte IEEE 802.1Q Tag 208, a 2-byte Ethertype/length 210, a 46-1,500-byte Payload 212, and a 4-byte Frame Check Sequence (FCS) 214, all of which are well known in the art. An inter-frame gap (IFG) 216 may be 12 bytes in length and may be positioned between successive Ethernet frames.

In accordance with one embodiment of the disclosure, the preamble 202 may be further understood by referring to the "exploded" view in FIG. 2, which illustrates six fields: a one-byte start-of-frame delimiter (SFD) 218, a one-byte first reserved field 220, a one-byte start-of-LLID delimiter (SLD) 222, a two-byte second reserved field 224, a two-byte LLID 226, and an eight bit Cyclical Redundancy Check (CRC-8) 228. The LLID 226 may be a logical identifier assigned to a device (e.g. the OLT 110, the CLT 120, or the CNU 130) or a port within a device. Thus, one device may have multiple LLIDs 226. The LLID 226 may also be called a coaxial medial converter (CMC) ID or an optical conversion unit (OCU) ID. The LLID 226 may be used by a device to distinguish frames addressed to the device from frames addressed to other devices. The first bit of the LLID 226 may comprise a mode bit that is used to select the transmission mode of the frame, i.e. a unicast transmission or broadcast transmission. The other fields in the Ethernet frame 200 are well known in the art.

In accordance with an embodiment of the disclosure, an "exploded" view of the LLID 226 illustrates a 1-byte LNID 225 and a 1-byte CNU ID 227. The LNID 225 may be a logical identifier assigned to an intermediary device within the unified optical-coaxial network 100 (e.g. the CLT 120), and may occupy the first eight bits of LLID 226. The one-byte CNU ID 227 may be a logical identifier assigned to a CNU 130 or a port within a CNU 130, and may occupy the final eight bits of the LLID 226.

Figure 3:
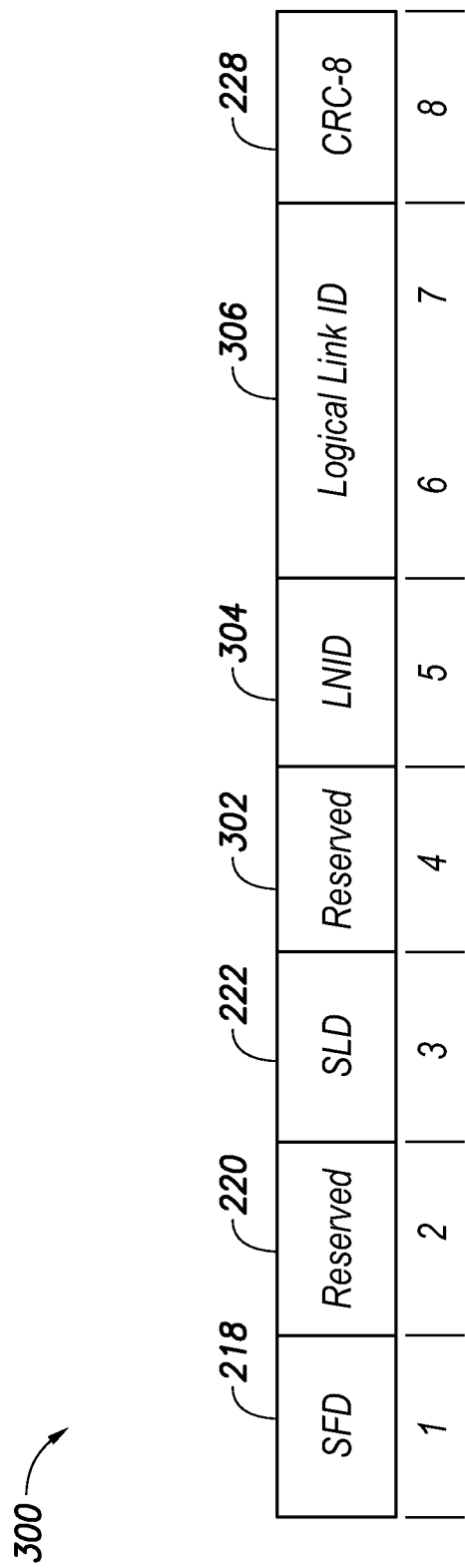
FIG. 3 is a schematic diagram of a portion of an Ethernet frame in accordance with another embodiment of the disclosure.

Refer now to FIG. 3 illustrating a Preamble field 300 in accordance with another embodiment of the disclosure. Similar to the Preamble 202 in FIG. 2, the Preamble 300 begins with the SFD 218 followed by the first reserved field 220 and the SLD 222. The second reserved field 302 comprises one byte and is followed by a one-byte LNID 304. Thus, in the embodiment of FIG. 3, the LNID 304 is embedded in the second byte of the first reserved field 224 in the Ethernet frame preamble 202 as depicted in FIG. 2. Returning to FIG. 3, the next field, LLID 306, may be two bytes in length and may comprise the LLID value and perhaps the CNU ID 227. The preamble 300 may conclude with the CRC-8 228.

Note that the two embodiments illustrated in FIGS. 2 and 3 are examples by which an LLID value may be embedded in an Ethernet frame. It would be understood by those skilled in the art that any available field in the preamble or the frame may be used, and such alternatives would fall within the spirit and scope of the claimed inventions. Also, the order of the fields in FIGS. 2 and 3 is illustrative of an Ethernet frame in accordance with IEEE 802.3. However, the principles of the disclosure are not limited to a particular frame architecture, and other predetermined message formats may be used therewith. Likewise, the respective lengths of the fields are similarly illustrative, and other predetermined field lengths in accordance with other message formats may be used in alternative embodiments, and such embodiments would lie within the spirit and scope of the claimed inventions.

Figure 4:
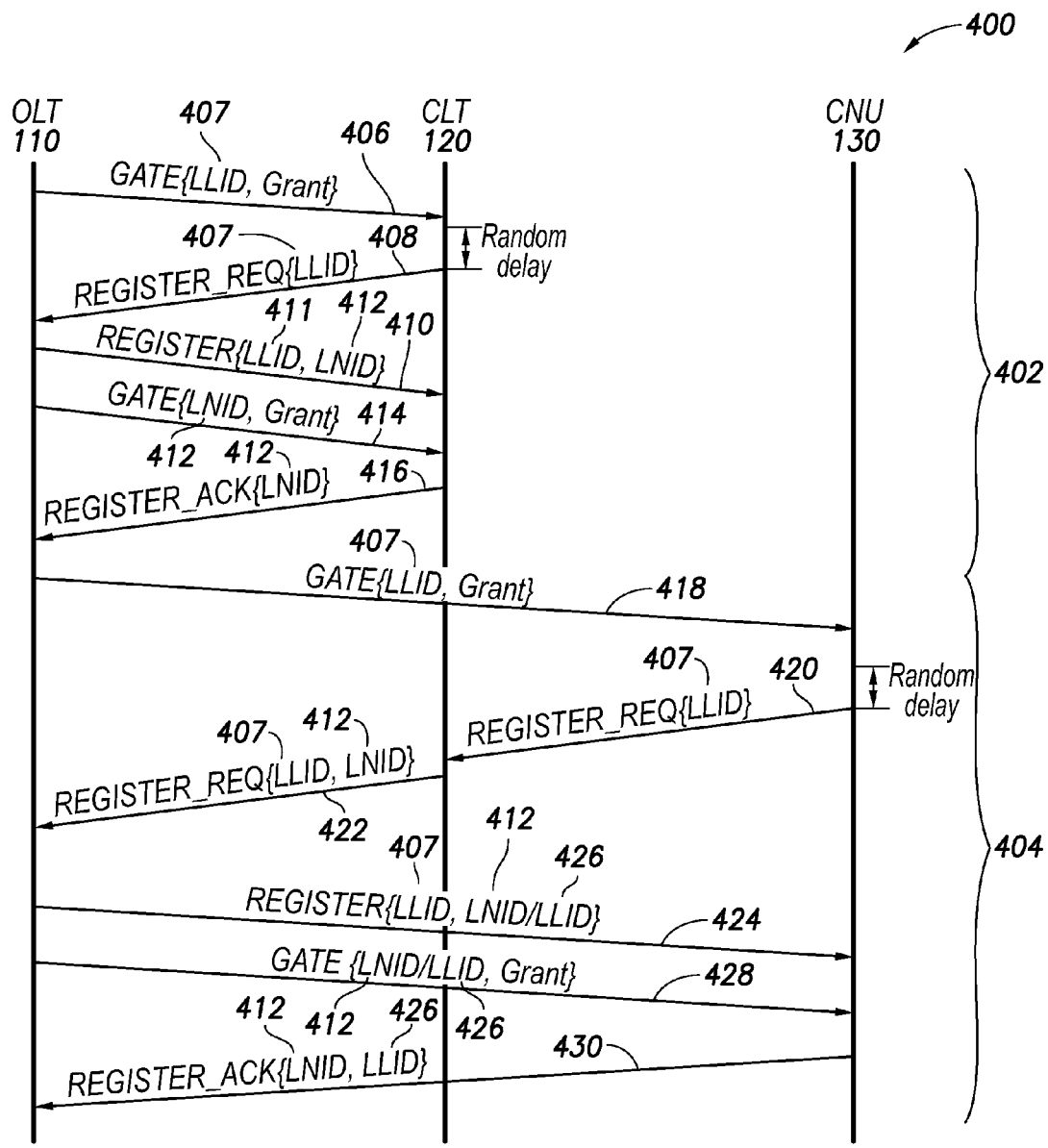
FIG. 4 is a protocol diagram of a registration protocol in accordance with an embodiment of the disclosure.

To further appreciate identification of a CLT in a unified optical-coaxial network, refer now to FIG. 4 illustrating a registration protocol 400 in a unified optical-coaxial network in accordance with an embodiment of the disclosure in which an OLT 110 discovers and registers both the CLT 120 and the CNU 130. Registration protocol 400 illustrates an embodiment having two stages: CLT registration stage 402 and CNU registration stage 404. In CLT registration stage 402, the CLT 120 is registered with the OLT 110, and in CNU registration stage 404, the CNU 130 is registered with the OLT 110.

Referring first to CLT registration stage 402, the OLT 110 may broadcast a Gate message 406. The payload of Gate message 406 may include a Grant allocating a discovery window, e.g. a timeslot whereby a node, such as CLT 120, receiving the broadcast message and desiring to register with the OLT 110 may transmit a registration message. The CLT 120, desiring to register with the OLT 110, may respond with a registration request message, Register_Req 408, when the discovery window opens. Register_Req 408 may comprise the LLID 407 and may be sent after the expiry of a random delay to mitigate contentions between a plurality of CLTs 120 attempting to register with the OLT 110. The OLT 110 may respond with a registration message, Register 410, which may provide the CLT 120 with identification parameters. In the embodiment shown in FIG. 4, Register 410 includes the LNID 412 assigned to CLT 120, and optionally the LLID 411 (a unicast LLID for the CLT 120). The LNID 412 may be sent to CLT 120 in a payload or other predetermined portion of the message. Register 410 may be transmitted to the CLT 120 on a unicast channel and include a unicast LLID 411 in a preamble or other predetermined portion of Register 410.

Having received Register 410 including LNID 412, the CLT 120 can now be identified using LNID 412. Thus, OLT 110 may allocate a timeslot for the CLT 120 to return a registration acknowledgement by sending Gate 414 containing a timeslot grant and the assigned LNID 412, for example in a preamble or other predetermined field of Gate 414. When the timeslot allocated in Gate 414 opens, the CLT 120 may return a registration acknowledgement message, Register_Ack 416, with the LNID 412 to OLT 110, completing the registration of CLT 120. Further, CLT 120 may use LNID 412 to recognize and/or filter messages broadcast by the OLT 110 and which are addressed to it or to one or more downstream nodes, e.g. CNU 130 and/or subscriber devices 140 (see FIG. 1), as will be described further below.

Turning now to CNU registration stage 404, the OLT 110 may broadcast Gate 418 to allocate a timeslot to CNU 130. The Gate 418 may comprise the LLID 407 (a broadcast LLID for the OLT 110) and the timeslot grant. The CNU 130 may desire to register with OLT 110, and as such may return a registration request, Register_Req 420, which may comprise the LLID 407. The CLT 120 may insert the assigned LNID 412 in a payload or other predetermined field of Register_Req 420 and may forward the revised message, Register_Req 422, to the OLT 110. The OLT 110 may send a registration message, Register 424, to the requesting CNU 130. Register 424 may include identification parameters. For example, the OLT 110 may assign LLID 426 to the requesting CNU 130, and may include the LLID 426, the LLID 407, and the LNID 412 in Register 424. The OLT 110 may then allocate a timeslot to the requesting CNU 130 via Gate 428. Gate 428 may include the LNID 412 and optionally the LLID 426 in a preamble field or other predetermined field and the timeslot grant in the payload. Registration of the requesting CNU 130 completes when the OLT 110 receives the registration acknowledgment, Register_Ack 430, from the CNU 130.

Note that for simplicity, the embodiment of FIG. 4 has been described in the context of the registration of a CLT 120 and assigning a single LNID 412 thereto. However, it would be recognized by those skilled in the art that a CLT 120 could request registration of multiple LNIDs 412. For example, as described in conjunction with FIG. 1, CLT 120 may be coupled to a plurality of CNUs 130 via the EDN 135. In such an embodiment, the CLT 120 may request assignment and registration of an LNID for each of the connected coaxial cables. In an alternative embodiment, the CLT registration stage 402 and the CNU registration stage 404 may be reversed. In another alternative embodiment, the CLT 120 may obtain from the OLT 110 several LLIDs and/or timeslot grants from the CNUs 130, and distribute the LLIDs and timeslot grants to the CNUs 130 without assistance from the OLT 110. In such a case, the CLT 120 may report doing so to the OLT 110.

Figure 5:
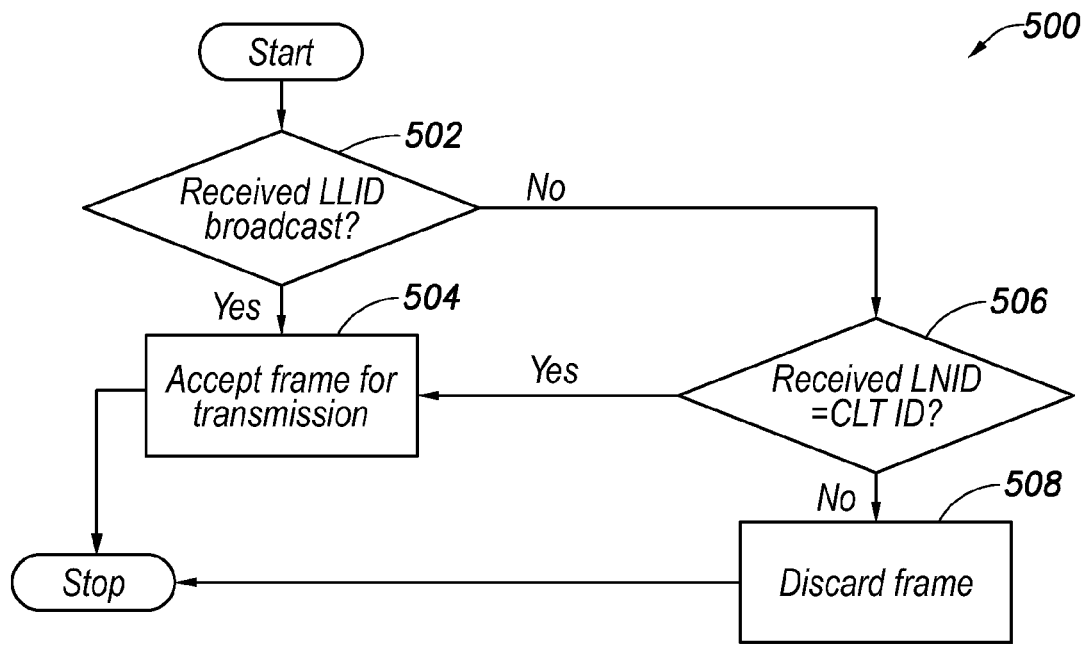
FIG. 5 is a flowchart of a process for filtering message frames in accordance with an embodiment of the disclosure.

To further appreciate an embodiment of a CLT equipped with an assigned LNID, consider FIG. 5, which depicts a flowchart of a process 500 for filtering frames in accordance with an embodiment of the disclosure. The process 500 may be implemented at a CLT or any other intermediate node. The process 500 begins at decision block 502 where the process 500 determines whether the LLID in the received frame is a broadcast LLID. A broadcast LLID may be an LLID intended for all devices (e.g. all CNUs) in the unified optical-coaxial network. If the LLID is a broadcast LLID, then process 500 falls through the "Yes" branch to block 504 where the process 500 accepts the frame for transmission to one or more downstream CNUs, e.g. CNUs 130 in FIG. 1. In other words, the frame is not filtered or otherwise prevented from reaching the CNU at the CLT. The determination in step 502 may be made for example by testing the value of mode bit of LLID 226, FIG. 2. For example, a value of 1 for the mode bit represents a broadcast LLID in an embodiment of an Ethernet frame in accordance with IEEE 802.3. Returning to block 502, if the LLID in the received frame is not a broadcast LLID, the process 500 proceeds by the "No" branch to decision block 506. At block 506, the LNID in the received frame (e.g. LNID 225 in LLID 226) is reviewed to determine whether the received LNID equals the LNID assigned to the CLT. If the received LNID equals the LNID assigned to the CLT, then the process 500 proceeds by the "Yes" branch to block 504 where the frame is accepted for transmission. Returning to block 506, if the received LNID does not equal the LNID assigned to the CLT, the process 500 proceeds to block 508 where the frame is discarded. Note that block 504 is described in the context of an embodiment of a frame preamble as shown in and described in conjunction with FIG. 2, e.g. Preamble 202. In an embodiment of a message frame in which the an LNID is contained in another predetermined field of the frame, such as a Preamble 300 in FIG. 3, the corresponding test in block 504 would be readily apparent to those skilled in the art. Further, as discussed hereinabove in conjunction with FIG. 4, in alternative embodiments a CLT may register multiple LNIDs and the corresponding embodiment of the test in decision block 506 would be readily apparent of those skilled in the art.

Figure 6:
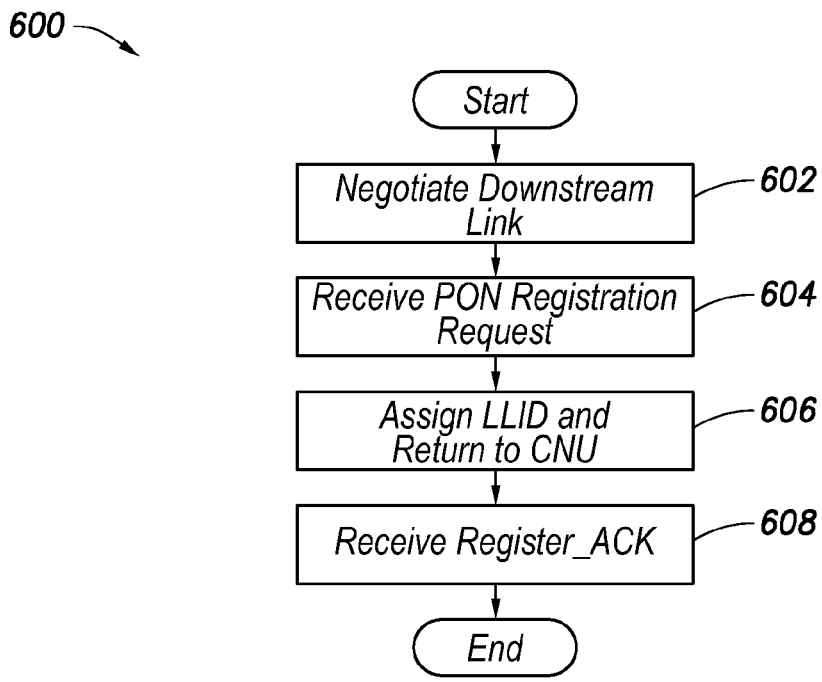
FIG. 6 is a flowchart of a process for registering a network unit in accordance with an embodiment of the disclosure.

Refer now to FIG. 6, which is a flowchart of a process 600 for registering a network unit, such as a CNU, on a network in accordance with an embodiment of the disclosure. In step 602, the CLT (e.g. a CLT 120) having a connected network unit (e.g. CNU 130) to be registered, negotiates and establishes a downstream link with the network unit. For example, in an embodiment in accordance with FIG. 1, the downstream link may be established via the coaxial PHY 129. The negotiation of the downstream link will be described further in conjunction with FIG. 7. Next, in step 604, the network unit sends an MPCP registration request upstream to the CLT via the link established in step 602. The CLT passes the registration request through to the OLT, (e.g. OLT 110) in a discovery window allocated by the OLT as previously described. In step 606, the OLT assigns a LLID to the network unit and returns the LLID to the registering CNU via an MPCP register message, also described hereinabove. The network unit responds with a Register-Ack message back to the OLT, step 608, completing the registration of the network unit.

Figure 7:
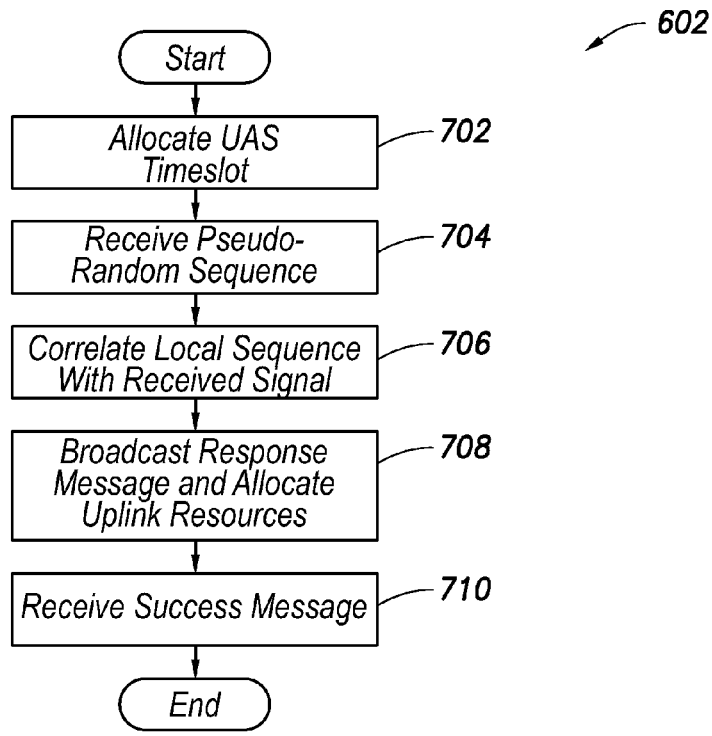
FIG. 7 is a flowchart of a portion of the process of FIG. 6.

Refer now to FIG. 7, where the negotiation of the downstream link between the CLT and CNU, e.g. step 602 in FIG. 6, is described further. In step 702, the CLT allocates an Uplink Access Sequence (UAS) timeslot to a network unit to be registered. In step 704, the network unit selects a pseudo-random sequence with a unique ID and returns it to the CLT via the UAS timeslot. The CLT correlates the received signal with local sequences in step 706 and, upon affirming a sequence, broadcasts a response message with the sequence ID, and allocates uplink resources in step 708. On receipt of the message broadcast in step 708, the CNU transmits a success message to the CLT in step 710.

Figure 8:
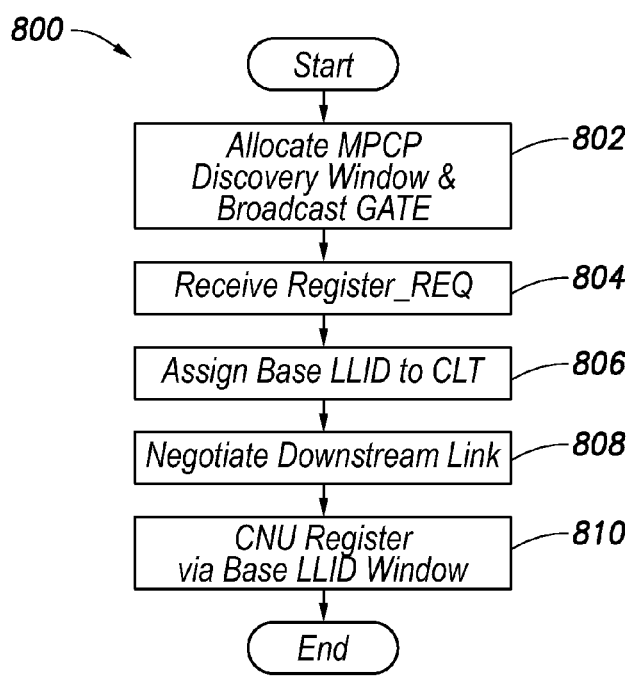
FIG. 8 is a flowchart of a process for registering network unit in accordance with another embodiment of the disclosure.

FIG. 8 is a flowchart of a network unit registration process 800 in accordance with another embodiment of the disclosure. In step 802, an OLT allocates an MPCP discovery window and broadcasts a Gate message. In step 804, the CLT, desiring to register, returns an MPCP register request message in the discovery window, as described hereinabove. The OLT assigns a LLID to the CLT, which may be the base LLID for the coaxial portion at step 806. Step 806 may use the registration message protocol described in conjunction with the embodiment of FIG. 4. In step 808, the CLT and downstream network unit, e.g. a CNU 130, negotiate a coaxial PHY link as described in conjunction with FIG. 7. In step 810, the network unit registers with the OLT via the LLID assigned in step 806 using LLID windows associated therewith, rather than MPCP discovery windows. Thus, for example, in an embodiment as set forth in FIG. 1, CNU 130 MPCP registration may be completed in the optical portion.

Figure 9:
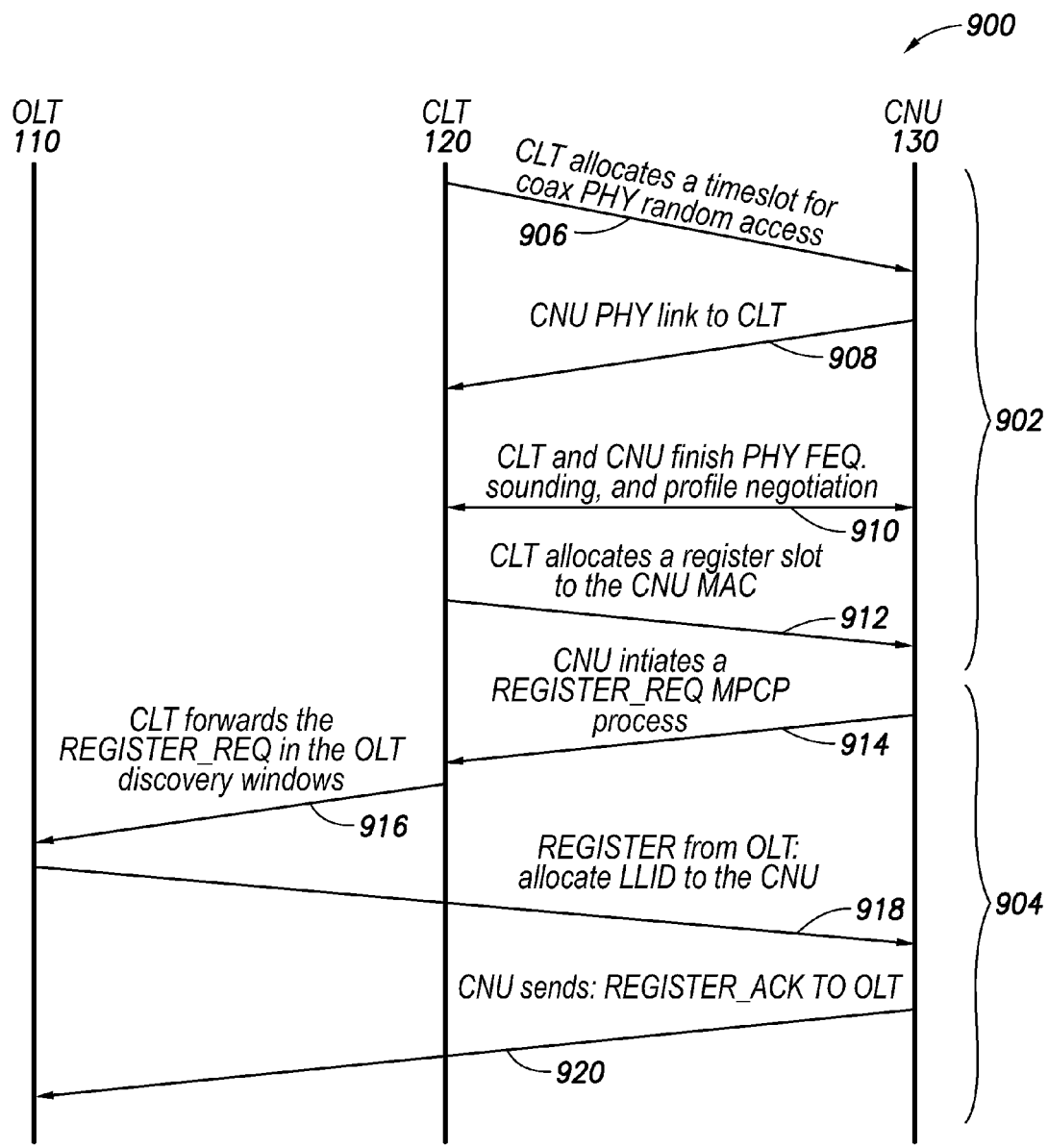
FIG. 9 is a protocol diagram of a registration protocol in accordance with an embodiment of the disclosure.

Refer now to FIG. 9 which depicts a schematic diagram of a registration protocol 900 in accordance with an embodiment of the disclosure. Registration protocol 900 may utilize the steps illustrated in the processes described in conjunction with FIGS. 6 and 7. Also, registration protocol 900 will be described in the context of unified optical-coaxial network 100 shown in FIG. 1; however, it will be understood by those skilled in the art that the principles set forth herein are not limited to the embodiment illustrated therein.

Registration protocol 900 may be comprised of a CNU coaxial access portion 902 whereby a CNU 130 establishes a connection on a coaxial portion of a unified optical-coaxial network, e.g. coaxial portion 152, FIG. 1, to a CLT 120, and a PON registration portion 904.

Considering first coaxial access portion 902, a CLT 120 broadcasts a message 906 allocating a time slot for a random access on the coaxial portion 152. A CNU 130, desiring to register with an OLT 110, responds with a message 908 initiating a PHY link to the CLT 120. CLT 120 and the CNU 130 exchange messages 910 completing the negotiation of the link channel profile. With the link established, CLT 120 sends a message 912 allocating a registration slot, i.e. a time window to the CNU 130 MAC (not shown in FIG. 1) for initiating its registration request.

Considering now PON registration portion 904, CNU 130 transmits a registration request 914 to OLT 110 via CLT 120 using the time slot allocated in message 912. CLT 120 forwards the registration request upstream, message 916, when a discovery window opens on the optical portion 150 of the network. OLT 110 returns a REGISTER message 918 allocating an LLID to the requesting CNU 130, and the CNU 130 returns a REGISTER_ACK message 920 to OLT 110.

Figure 10:
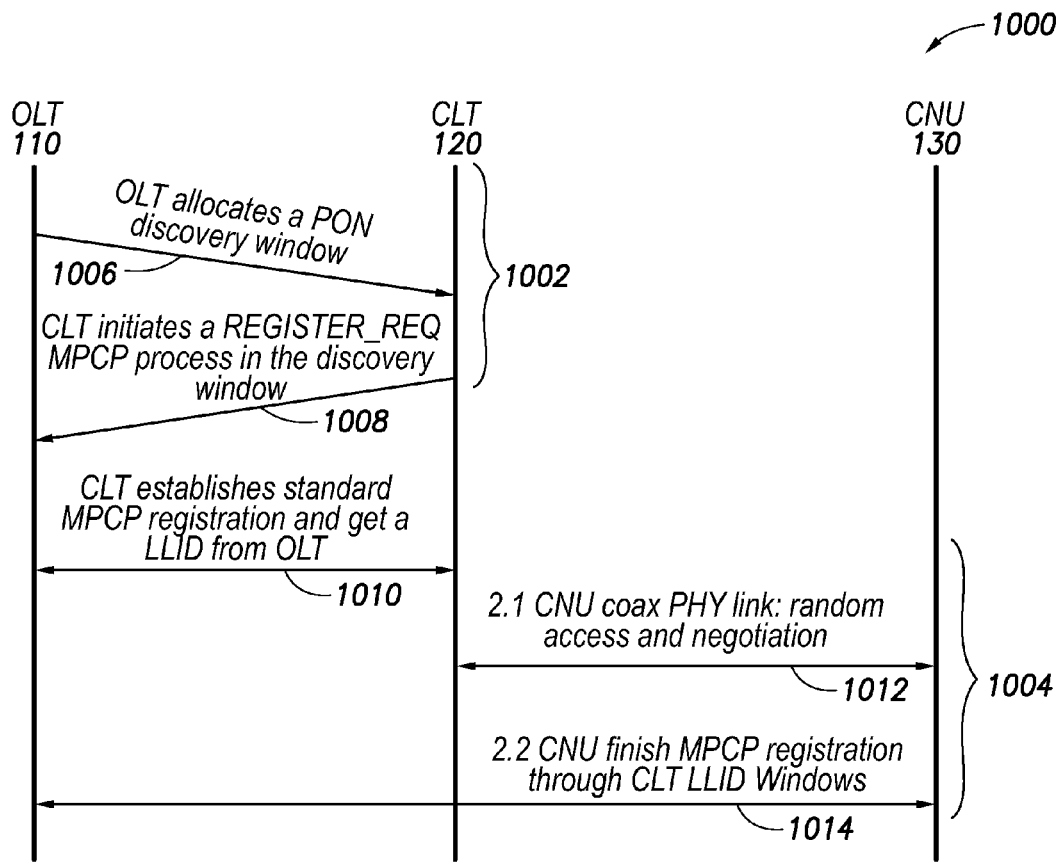
FIG. 10 is a protocol diagram of a registration protocol in accordance with another embodiment of the disclosure.

Refer now to FIG. 10 which depicts a schematic diagram of a registration protocol 1000 in accordance with an embodiment of the disclosure. Registration protocol 1000 may utilize the steps illustrated in the processes described in conjunction with FIG. 8. Also, registration protocol 1000 will be described in the context of unified optical-coaxial network 100 shown in FIG. 1; however, it will be understood by those skilled in the art that the principles set forth herein are not limited to the embodiment illustrated therein.

Registration protocol 1000 may comprise CLT registration portion 1002 and a CNU registration portion 1004. Considering first the registration portion 1002, a CLT 110 sends a discovery window message 1006 on the optical portion 150 of a unified optical-coaxial network 100. A CLT 120 initiates a REGISTER_REQ message 1008 in the discovery window. The CLT 120 and OLT 110 exchange MCPC registration messages 1010 and the CLT 120 is allocated an LLID which may be a base LLID for the coaxial portion 152 of the unified optical-coaxial network 100.

Considering now CNU registration portion 1004, the CLT 120 and CNU 130 exchange messages 1012 bringing up a link on the coaxial portion 152 of the network. CNU 130 may then complete registration using the LLID windows, message exchange 1014, rather than discovery windows. In this way MPCP registration can be completed on the optical portion 150 of the unified optical-coaxial network 100 to mitigate contention.

Figure 11:
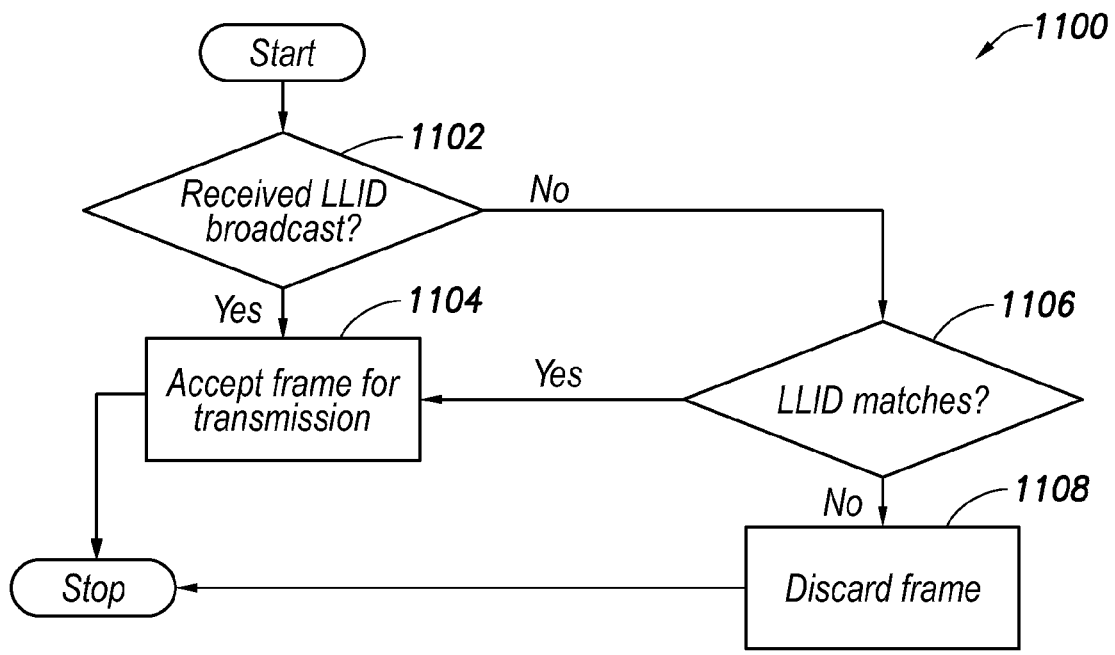
FIG. 11 is a flowchart of a process for filtering message frames in accordance with another embodiment of the disclosure.

Refer now to FIG. 11 illustrating flowchart of a process 1100 for filtering message frames in accordance with another embodiment of the disclosure. Process 1100 will be described in the context of unified optical-coaxial network 100 shown in FIG. 1; however, it will be understood by those skilled in the art that the principles set forth herein are not limited to the embodiment illustrated therein.

Figure 12:
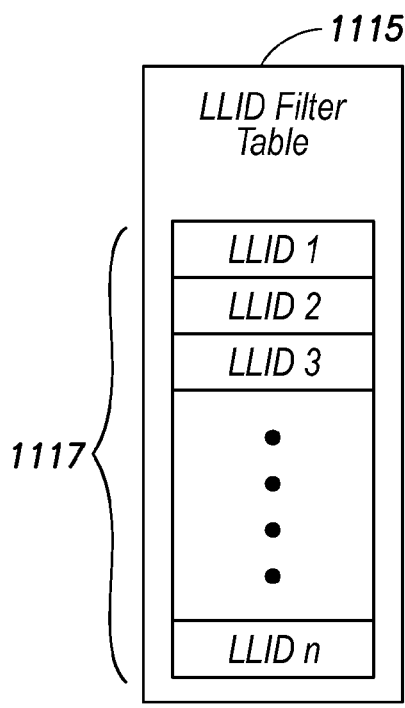
FIG. 12 is a schematic diagram of an embodiment of a LLID filter table.

The process 1100 may be used by a CLT 120 or any other intermediate node. The CLT 120 may comprise an LLID filter table 1115 (shown in FIG. 12), which may be used in conjunction with process 1100. Filter table 1115 includes a plurality of entries 1117. Each entry of the plurality may comprise a LLID corresponding to a network device on a coaxial portion 152 of a unified optical-coaxial network 100, for example CNUs 130. In filter table 1115, LLID1, LLID2, LLID3, . . . , LLIDn are shown by way of example.

Returning to FIG. 11, the process 1100 begins at decision block 1102 where the process 1100 determines whether the LLID in the received frame is a broadcast LLID. A broadcast LLID may be an LLID intended for all devices (e.g. all CNUs) in the unified optical-coaxial network. If the LLID is a broadcast LLID, then process 1100 falls through the "Yes" branch to block 1104 where the process 1100 accepts the frame for transmission to one or more downstream CNUs, e.g. CNUs 130 in FIG. 1. In other words, the frame is not filtered or otherwise prevented from reaching the CNU at the CLT. The determination may be made as described in conjunction with step 502, FIG. 5. Returning to block 1102, if the LLID in the received frame is not a broadcast LLID, the process 1100 proceeds by the "No" branch to decision block 1106.

In block 1106, process 1100 determines if the received LLID matches a value in an entry of the plurality of entries 1117. If the LLID matches in block 1106, process 1100 proceeds by way of the "Yes" branch to block 1104 and the message frame is accepted for transmission. Otherwise, if the LLID does not match in block 1106, process 1100 falls through the "No" branch and the frame is discarded at block 1108.

Figure 13:
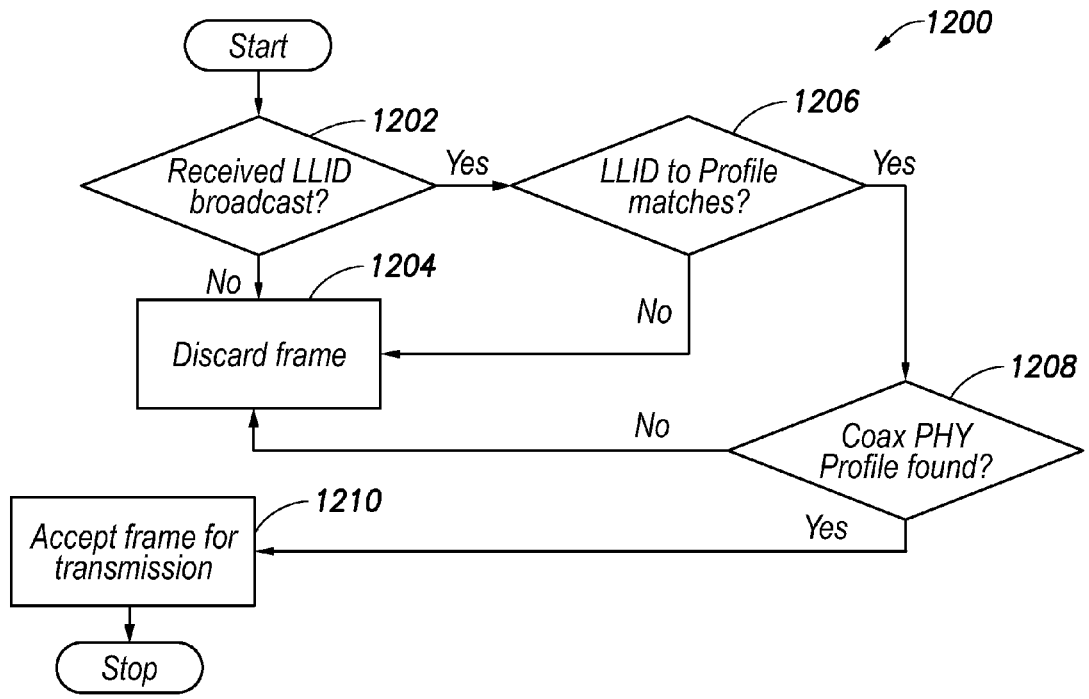
FIG. 13 is a flowchart of a process for filtering message frames in accordance with yet another embodiment of the disclosure.

Refer now to FIG. 13 illustrating flowchart of a process 1200 for filtering message frames in accordance with yet another embodiment of the disclosure. Process 1200 will be described in the context of unified optical-coaxial network 100 shown in FIG. 1; however, it will be understood by those skilled in the art that the principles set forth herein are not limited to the embodiment illustrated therein.

Figure 14:
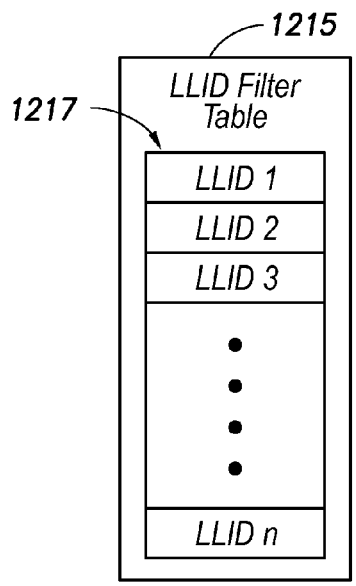
FIG. 14 is a schematic diagram of an embodiment of a LLID filter table.
Figure 15:
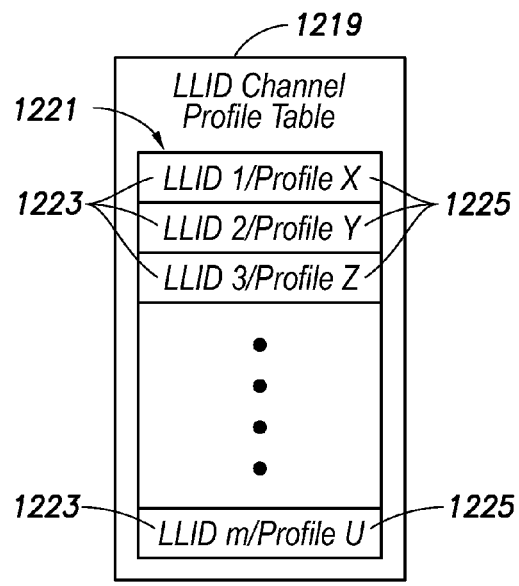
FIG. 15 is a schematic diagram of an embodiment of a LLID channel profile table.

The process 1200 may be used by a CLT 120 or any other intermediate node. The CLT 120 may comprise an LLID filter table 1215 (shown in FIG. 14), which may be used in conjunction with process 1100. Filter table 1215 includes a plurality of entries 1117. Each entry of the plurality may comprise a LLID corresponding to a network device on a coaxial portion 152 of a unified optical-coaxial network 100, for example CNUs 130. In filter table 1115, LLID1, LLID2, LLID3, . . . , LLIDn are shown by way of example. Additionally, CLT 120 may comprise a LLID channel profile table 1219 (shown in FIG. 15) including a plurality of entries 1221. Each entry may comprise a LLID index portion 1223 and a channel profile portion 1225. An LLID index portion 1223 may include a LLID; here shown as LLID1, LLID2, LLID3, . . . , LLIDm. The number of entries 1221 need not be the same as the number of entries 1217, nor do the LLIDs in LLID table 1215 necessarily correspond to each LLID in an LLID index portion 1223. Channel profile portions 1225 may include channel PHY profile data for the coaxial portion 152 of the unified optical-coaxial network 100. Channel PHY profile data may include, for example, orthogonal frequency division multiplex (OFDM) modulation order, forward error correction (FEC) coding scheme, power level and the like. Further, a channel profile portion 1225 may be empty, or null, for some entries 1221.

Returning to FIG. 13, the process 1200 begins at decision block 1202 where the process 1100 determines whether the LLID in the received frame matches an LLID in an entry 1217 of table 1215. If there is no match, process 1200 proceeds by the "No" branch and the frame is discarded in block 1204. Otherwise, process 1200 proceeds by the "Yes" branch (a match has been found) to decision block 1206. In block 1206, process 1200 indexes into channel profile table 1219 using the matched LLID. If there is no corresponding entry, process 1200 proceeds by the "No" branch of block 1206, and the frame is discarded at block 1204. If there is a corresponding entry 1221 in channel profile table 1219, process 1200 proceeds by the "Yes" branch to decision block 1208. At block 1208, process 1200 determines if the channel profile portion 1225 of the entry 1221 of the LLID index portion 1223 corresponding to the matched LLID contains channel PHY profile data. Recall that some entries 1221 may comprise a null channel portion 1225. If a profile is found at block 1208, the frame is accepted for transmission at block 1210. Conversely, if no profile is found (the channel profile portion 1225 is empty or null), the frame is discarded at block 1204.

Figure 16:
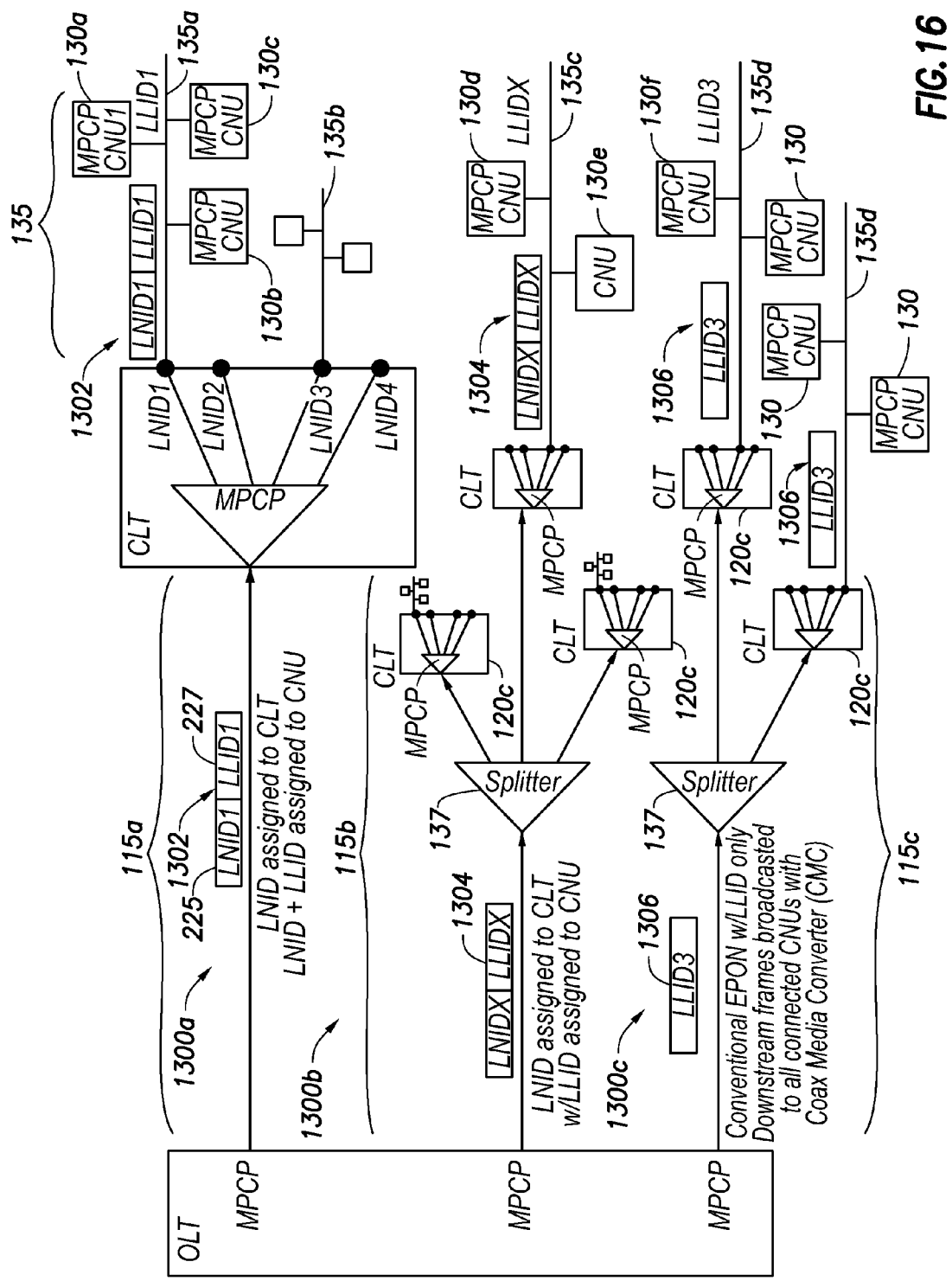
FIG. 16 is a schematic diagram of downstream message flows in accordance with embodiments of the disclosure.

To further appreciate the disclosed embodiments, refer now to FIG. 16 illustrating three downstream message flows 1300a-1300c in accordance with the various embodiments discussed hereinabove. In each of these OLT 110 transmits a message, as described further below, via an ODN 115 and a CLT 120 to a CNU 130 coupled to an EDN 135. Referring now to message flow 1300a, a message 1302 is transmitted from OLT 110 to a CNU 130 via a portion 115a of ODN 115. As discussed in conjunction with FIG. 2, the LNID may be carried in a portion of the LLID field of preamble of an Ethernet frame (field 225) and a CNU ID portion comprising the remaining portion (field 227) of the LLID field (field 226). In this way, both the LNID portion and the CNU ID portion may be assigned to a CNU 130. Message 1302 comprises an LNID portion, LNID1 assigned to CLT 120a, and a CNU ID portion, LLID1 assigned to CNU 130a. As discussed hereinabove, a CLT 120 may have one or more assigned LNID. Here, the CLT is shown with four LNIDs (LNID1-LNID4); however, it would be appreciated that a CLT 120 may, in principle, have any finite number of LNIDS. Different LNIDs assigned to CLT 120a may be associated with different portions of EDN 135; portion 135a is shown as associated with LNID1 and portion 135b as associated with LNID3. Further, it would be understood by those skilled in the art that in accordance with message flow 1300a, another message, addressed to one of CNUs 130b or 130c might contain LNID1 and the CNU ID assigned to the corresponding one of CNU 130b and 130c.

Referring now to message flow 1300b, a message 1304 is transmitted from OLT 110 to a CNU 130 via a portion 115b of ODN 115. CLT 120b may be identified by an assigned LNID, here LNIDX. As described in conjunction with FIG. 3, a LNID may be carried in a field of the preamble of an Ethernet frame (e.g. field 304). A LLID assigned to a CNU may also be carried in a field of the Ethernet preamble (e.g. field 306). Thus, CLT 120 may be assigned LNIDX and CNU 130d may be assigned LLIDX. Thus CLT 120b may forward message 1304 to CNU 130d using LLIDX.

Referring now to message flow 1300c, a message 1306 is transmitted to CNU 130f by OLT 110. Message 1306 comprises an LLID, LLID3 assigned to CNU 130f. CLTs 120c may have no LNID assigned. CLTs 120c may broadcast message 1306 to all connected CNUs 130, including CNU 130f.

Figure 17:
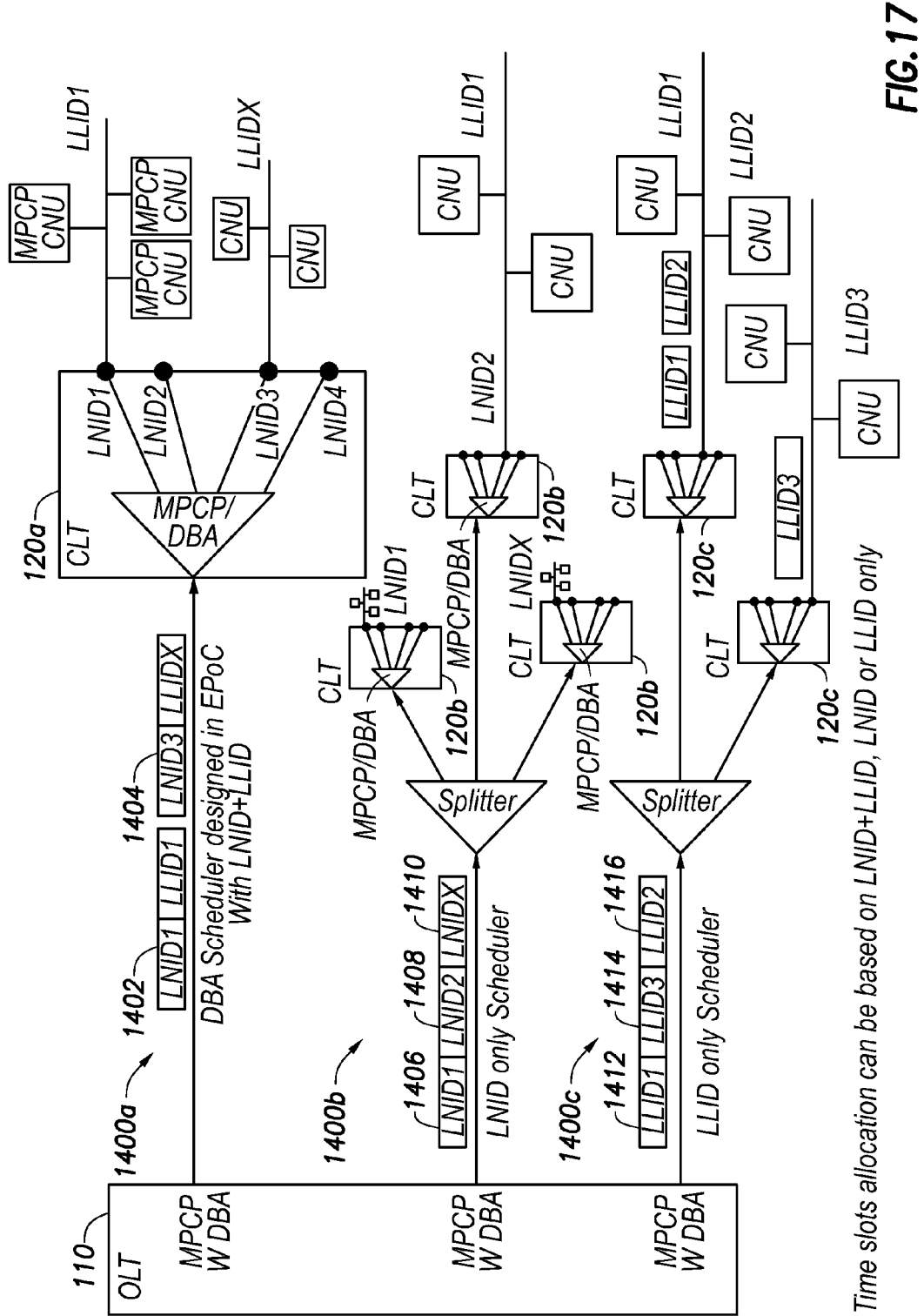
FIG. 17 is a schematic diagram of an upstream message flows in accordance with embodiments of the disclosure.

Refer now to FIG. 17 illustrating three upstream message flows 1400a-1400c in accordance with the various embodiments discussed hereinabove. These will be described in the context of unified optical-coaxial network 100 shown in FIG. 1; however, it will be understood by those skilled in the art that the principles set forth herein are not limited to the embodiment illustrated therein. In each of these one or more CNUs 130 transmits a message, as described further below, via an EDN 135 and a CLT 120 to an OLT 110 coupled to an ODN 155. An OLT 110 comprises a dynamic bandwidth allocation (DBA) scheduler.

Referring to message flow 1400a, message windows 1402 and 1404 are transmitted from a CNU 130 to an OLT 110. In message flow 1400a, a window on the optical portion 150 of a unified optical-coaxial network may be allocated by the scheduler based on a request by the CLT 120 for respective time slots for each LLID having data and each of the CNU 120's assigned LNID. In other words, a time slot allocation is on per LNID per connected LLID. Thus message 1402 is occupying a time slot allocated to LLID1 connected to LNID1. Similarly, 1404 occupies a time slot allocated to LLIDX connected to LNID3. Both LNID1 and LNID3 may be assigned to CLT 120a.

Referring now to message flow 1400b, time slots are allocated on a per LNID basis. Thus, the three windows 1406, 1408, and 1410 may comprise time allocations to LIND1, LIND2, and LINDX, respectively. Messages occupying those time slots may comprise data from one or more CNUs 130 connected to the corresponding LNID, shown here assigned to respective CLTs 120b.

Referring now to message flow 1400c, time slots are allocated on a per LLID basis. Thus, windows 1412, 1414, and 1416 may comprise time allocations to LLID1, LLID3, and LLID2, independent of any LNID to which the corresponding CNU 130 may be connected, or if an LNID has been assigned to a CLT 120, for example CLT 120*c*.

Figure 18:
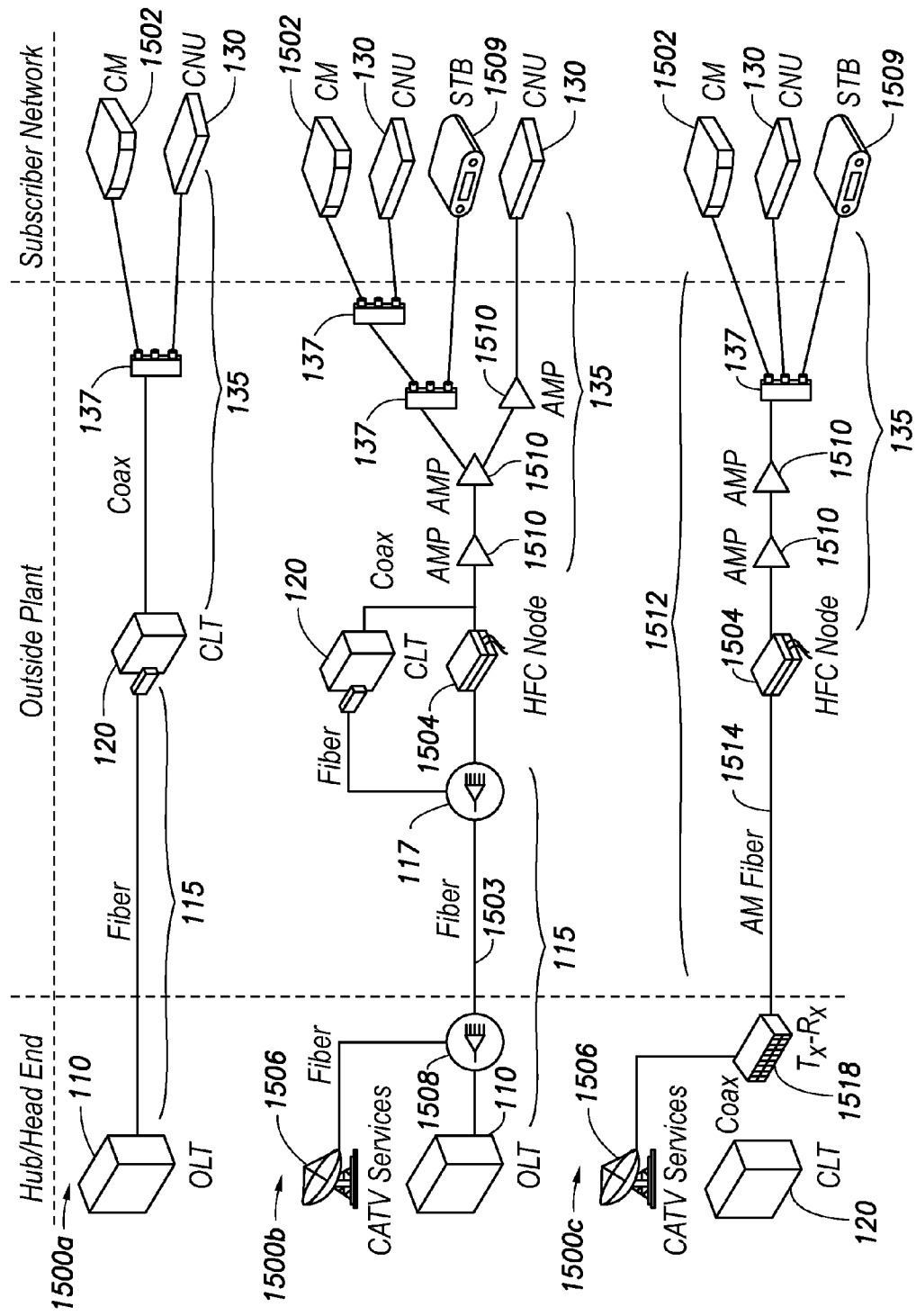
FIG. 18 is a schematic diagram of deployments of a unified optical-coaxial network in accordance with embodiments of the disclosure.

To further appreciate the unified optical-coaxial network 100, refer now to FIG. 18 illustrating unified optical-coaxial networks 1500*a*, 1500*b*, and 1500*c* representing various deployment environments in accordance with embodiments of the disclosure. Unified optical-coaxial network 1500*a* comprises an OLT 110 which may be located at a hub or head end facility coupled to CLT 120 via ODN 115. Each of OLT 110 and CLT 120 may comprise a processor and other logic (not shown) configured to manage and allocate upstream bandwidth in accordance with embodiments disclosed hereinabove. Further, CLT 120 may, for example, include a processor and other logic (not shown) configured buffer upstream traffic and forward the traffic to OLT 110 during a time window allocated by the OLT 110 as described in conjunction with embodiments disclosed above.

CLT 120 may be coupled to subscriber devices such as cable modem (CM) 1502 and CNU 130. It would be appreciated that subscriber devices CM 1502 and CNU130 are provided by way of example, and other types of subscriber devices may be connected to CLT 120. As described in conjunction with FIG. 1, CNU 130 also may act as an intermediary between OLT 110 and subscriber devices such as a personal computer, television, set-top box and the like (not shown in FIG. 18). CLT 120 may be coupled to the CNU 130 and CM 1502 via Electrical Distribution Network (EDN) 135 which may comprise splitter 137. Further, in unified optical-coaxial network deployment 1500*a* EDN 135 may comprise passive coaxial cables.

Unified optical-coaxial network 1500*b* may comprise a unified optical-coaxial network deployment through amplifiers in conjunction with cable television CATV services 1506. In unified optical-coaxial network 1500*b*, OLT 110 is coupled to CLT 120 through ODN 115. ODN 115 may carry (CATV) services 1506 via multiplexer 1508, which multiplexes CATV signals onto fiber 1503. Additionally, multiplexer 1508 may multiplex signals from OLT 110 onto fiber 1503. CATV signals multiplexed onto fiber 1503 may comprise amplitude modulated (AM) analog signals, while signals from OLT 110 multiplexed onto fiber 1503 may comprise digital signals. ODN 115 may include a splitter 117 which may split the digital signals from OLT 110 and analog signals from CATV services 1506 on fiber 1503 and couples these signals to CLT 120 and hybrid fiber-coaxial (HFC) node 1504, respectively. Traditionally, HFC networks have been used to carry CATV services, but it would be appreciated that other services such as high-speed data services and telephony services may also be carried.

EDN 135 may couple signals from CLT 120 and HFC node 1504 to subscriber devices such as CNUs 130, CM 1502, and set-top box (STB) 1509. Again, CNUs 130, CM 1502, and STB 1509 are shown by way of example and it would be appreciated that other types of subscriber devices may be coupled to CLT 120. Electrical signals from CLT 120 and HFC node 1504 may comprise signals in distinct frequency bands and may be combined on EDN 135. For example electrical signals from CLT 120 may comprise digital signals in a band of about 800 Megahertz (MHz) to about 1 Gigahertz (GHz) and electrical signals from HFC 1504 may comprise analog signals in a band from about 85 MHz to about 750 MHz. However, it would understood by those skilled in the art that the aforementioned frequency bands are provided by way of illustration and the principles of the disclosure are not limited to these bands.

EDN 135 may further comprise splitters 137 and amplifiers 1510. Amplifiers 1510 may be included in EDN 135 to mitigate against attenuation of electrical signals carried thereon. It would be recognized by those skilled in the art that, in various embodiments, the number of amplifiers 1510 used may be different or an embodiment may not use any amplifiers 1510.

Unified optical-coaxial network 1500*c* comprises a unified optical-coaxial architecture in which a CLT 120 may be located in a hub/head end facility and digital signals form the CLT 120 overlay an HFC portion 1512 which provides an intermediate optical fiber link, optical fiber 1514. Digital electrical signals from CLT 120 may be amplitude modulated onto an optical signal by optical transceiver 1518. Video signals from CATV services 1506 may also be amplitude modulated onto the optical signal by transceiver 1518 and transmitted to HFC node 1504. HFC node 1504 may convert optical signals received on optical fiber 1514 to electrical signals for transmission via EDN 135 to subscriber devices such as CM 1502, CNU 130, and STB 1509. CM 1502, CNU 130, and STB 1509 again as provided in unified optical-coaxial network 1500*c* are by way of example and not intended to limit the disclosed embodiment to those types of devices, as would be understood by those skilled in the art. Electrical signals output by HFC node 1504 may comprise digital electrical signals arising from the aforementioned digital electrical signals from CLT 120, and analog electrical signals arising from CATV services 1506. As described in conjunction with unified optical-coaxial network 1500*b*, these respective electrical signals may comprise signals in distinct frequency bands.

Figure 19:
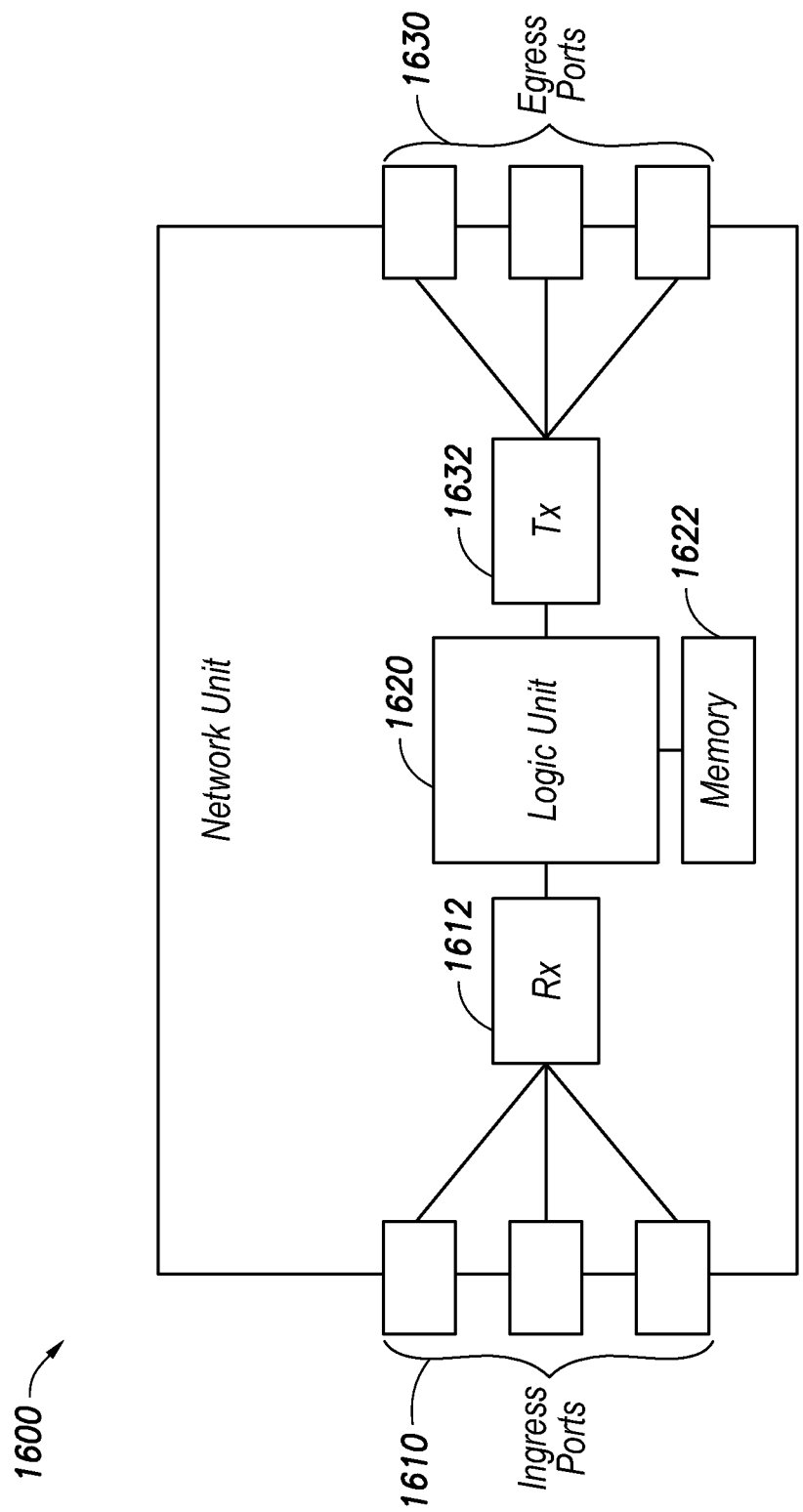
FIG. 19 is block diagram of an embodiment of a network unit.

At least some of the features/methods described in the disclosure may be implemented in a network apparatus or component, such as a network nodes or units described herein. For instance, the features/methods of the disclosure may be implemented using hardware, firmware, and/or software installed to run on hardware. The network apparatus/component or unit may be any device that transports frames through a network, e.g., a switch, router, bridge, server, etc. FIG. 19 illustrates an embodiment of a transmitter/receiver unit 1600, in which the disclosed methods and systems may be implemented. The transmitter/receiver unit 1600 may be any device that transports data through the network. The network unit 1600 may comprise one or more ingress ports or units 1610 coupled to a receiver (Rx) 1612 for receiving signals and frames/data from other network components. The network unit 1600 may comprise a logic unit 1620 to determine to which network components to send data. The logic unit 1620 may be implemented using hardware, software, firmware, or combinations thereof. Specifically, the logic unit 1620 may include a processor (which may be referred to as a central processor unit or CPU) that is in communication with memory devices 1622, including read only memory (ROM) and/or random access memory (RAM). The logic unit 1620 may be implemented as one or more general-purpose CPU chips running software stored in memory 1622, or may be part of one or more application specific integrated circuits (ASICs) and/or digital signal processors (DSPs). The network unit 1600 may also comprise one or more egress ports or units 1630 coupled to a transmitter (Tx) 1632 for transmitting signals and frames/data to the other network components. The components of the network unit 1600 may be arranged as shown in FIG. 19.

At least one embodiment is disclosed and variations, combinations, and/or modifications of the embodiment(s) and/or features of the embodiment(s) made by a person having ordinary skill in the art are within the scope of the disclosure.

Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A coaxial line terminal (CLT) comprising:
an optical port configured to couple to an optical line terminal (OLT) via an optical distribution network (ODN);
an electrical port configured to couple to a plurality of coaxial network units (CNUs) via an electrical distribution network; and
a processor coupled to the optical port and the electrical port, wherein the processor is configured to:
receive from the OLT a first plurality of frames addressed to a first CNU of the CNUs;
receive from the OLT a second plurality of frames not addressed to the first CNU, wherein the first plurality of frames and the second plurality of frames comprise logical link identifiers (LLIDs);
filter the first plurality of frames and the second plurality of frames based on the LLIDs and an LLID filter table for filtering frames received from the OLT; and
forward to the first CNU the first plurality of frames, but not the second plurality of frames, based on the filtering and a first entry of an LLID channel profile table for transmission between the CLT and the CNUs,
wherein the LLID channel profile table comprises a plurality of entries associated with LLIDs for the CNUs, and
wherein the first entry is associated with a first LLID for the first CNU.

2. The CLT of claim 1, wherein the LLID filter table comprises a logical node identifier (LNID) assigned to the CLT.

3. The CLT of claim 2, wherein a first frame of the first plurality of frames comprises a broadcast logical link identifier (LLID).

4. The CLT of claim 3, wherein the LLID channel profile table comprises channel physical layer (PHY) data.

5. The CLT of claim 4, wherein the channel PHY data is at least one of an orthogonal frequency division multiplex (OFDM) modulation order, a forward error correction (FEC) coding scheme, and a power level.

6. A method implemented in a coaxial line terminal (CLT), the method comprising:
receiving from an optical line terminal (OLT) a frame on an optical portion of a unified optical-coaxial network;
filtering the frame based on a logical link identifier (LLID) in the frame addressed to a first coaxial network unit (CNU) of a plurality of CNUs and an LLID filter table for filtering frames received from the OLT; and
in response to the filtering, transmitting the frame to the first CNU based on an entry of an LLID channel profile table for transmission between the CLT and the CNUs, wherein the entry is associated with an LLID for the first CNU.

7. The method of claim 6, further comprising broadcasting the frame to the plurality of CNUs when the LLID is a broadcast LLID.

8. The method of claim 6, further comprising dropping the frame when the LLID is not a broadcast LLID and when the frame does not comprise a logical node identifier (LNID) assigned to the CLT.

9. The method of claim 6, wherein the LLID filter table comprises a logical node identifier (LNID) assigned to the CLT.

10. The method of claim 9, wherein the LLID comprises a logical node identifier (LNID) assigned to the CLT and a CNU identifier (CNU ID) assigned to the first CNU.

11. A coaxial line terminal (CLT) comprising:
a processor; and
a memory coupled to the processor and comprising:
a logical link identifier (LLID) filter table for filtering frames received from an optical line terminal (OLT);
an LLID channel profile table for transmission between the CLT and a plurality of coaxial network units (CNUs), comprising a first entry associated with a first LLID for a first CNU of the CNUs; and instructions that cause the processor to:

receive a frame from the OLT via an optical network portion of a unified optical-coaxial network, wherein the frame comprises an LLID;

filter the frame based on the LLID and the LLID filter table; and if the frame passes the filtering, forward the frame to the first CNU based on the first entry.

12. The CLT of claim 11, wherein the first entry comprises channel physical layer (PHY) data.

13. The CLT of claim 12, wherein the channel PRY data is at least one of an orthogonal frequency division multiplex (OFDM) modulation order, a forward error correction (FEC) coding scheme, and a power level.

14. The CLT of claim 10, wherein the LLID filter table comprises a logical node identifier (LNID) assigned to the CLT.

15. A method implemented in a fiber coax unit (FCU), the method comprising:

receiving, from an optical line terminal (OLT) via an optical portion of a unified optical-coaxial network, an Ethernet frame comprising a preamble, wherein the preamble comprises a logical link identifier (LLID);

determining whether the LLID is a broadcast LLID;

when the frame is a broadcast frame, forwarding the frame to each of a plurality of coaxial network units (CNUs) via a coaxial portion of the network;

when the frame is not a broadcast frame, further comprising:

determining whether the LLID is in an LLID filter table in the FCU;

discarding the frame when the LLID is not in the LLID filter table;

processing the frame when the LLID is in the LLID filter table;

determining whether the LLID is in a channel profile table in the FCU when the LLID is in the LLID filter table;

discarding the frame when the LLID is not in the channel profile table;

determining whether an entry associated with the LLID comprises physical layer (PHY) profile data when the LLID is in the channel profile table;

discarding the frame when the LLID does not comprise the PHY profile data; and forwarding the frame to one of the CNUs via the coaxial portion when the LLID does comprise the PHY profile data.

* * * * *